US010245783B2

(12) United States Patent
Fuller

(10) Patent No.: US 10,245,783 B2
(45) Date of Patent: Apr. 2, 2019

(54) PRINTER FOR THREE DIMENSIONAL PRINTING

(71) Applicant: Kenneth Fuller, Lancaster, CA (US)

(72) Inventor: Kenneth Fuller, Lancaster, CA (US)

( * ) Notice: Subject to any disclaimer, the term of this patent is extended or adjusted under 35 U.S.C. 154(b) by 94 days.

(21) Appl. No.: 15/160,796

(22) Filed: May 20, 2016

(65) Prior Publication Data

US 2016/0339634 A1 Nov. 24, 2016

Related U.S. Application Data

(60) Provisional application No. 62/165,132, filed on May 21, 2015.

(51) Int. Cl.
*B29C 64/209* (2017.01)
*B29C 64/106* (2017.01)
(Continued)

(52) U.S. Cl.
CPC .......... *B29C 64/209* (2017.08); *B29C 64/106* (2017.08); *B29C 64/20* (2017.08); *B33Y 30/00* (2014.12)

(58) Field of Classification Search
CPC ............ B29C 67/0085; B29C 67/0096; B29C 67/0055; B29C 67/0051; B29C 67/0059; B29C 67/0062; B29C 67/0066; B29C 67/007; B29C 67/0074; B29C 67/0077; B29C 67/0081; B29C 67/0088; B29C 67/0092; B29C 31/042; B29C 47/00; B29C 47/04; B29C 47/08; B29C 47/0813; B29C 47/0855; B29C 47/0857; B29C 47/78; B29C 47/86; B29C 47/866; B29C 47/868; B29C 47/82; B29C 47/822; B29C 47/827;
(Continued)

(56) References Cited

U.S. PATENT DOCUMENTS 3,788,613 A * 1/1974 Romero ................ B29C 47/522
366/76.5
4,649,262 A * 3/1987 Yoshikawa ............. B29C 45/74
219/421
(Continued)

FOREIGN PATENT DOCUMENTS

NL 2014044 B9 * 3/2017 ............. H05B 6/108

*Primary Examiner* — Seyed Masoud Malekzadeh
*Assistant Examiner* — Taryn Trace Willett
(74) *Attorney, Agent, or Firm* — Eric Kelly

(57) ABSTRACT

The present invention discloses and describes 3D printers that print 3D objects with acceptable precision and accuracy. Such 3D printers may comprise one or more of: an extrusion core with particularized temperature controls; an extrusion core with particularized filament pathway geometry; an extrusion core with a nozzle that is integral with a heating block; an extrusion core with nozzles of variable orifice-openings; a filament feeding system using smooth-faced-rollers; a build plate with an adhesion-layer for wetting between the extrudate and the adhesion-layer; an alignment-plane for anchoring axis positioning systems to a common plane to minimize tolerance stacking problems; and a single z-axis guide, a mono-rail, for guiding movement of a build plate in the z-axis direction; which may permit use of minimal mechanical fit tolerances between the mono-rail and a complimentary receiving sleeve.

20 Claims, 29 Drawing Sheets

(51) Int. Cl.
*B29C 64/20* (2017.01)
*B33Y 30/00* (2015.01)

(58) Field of Classification Search
CPC ....... B29C 47/80; B29C 47/807; B29C 47/90; B29C 47/902; B29C 47/0871; B29C 47/0872; B29C 47/0876; B29C 47/0877; B29C 47/0879; B29C 47/0881; B29C 47/0883; B29C 47/0886; B29C 47/0889; B29C 47/124; B29C 47/665; B29C 47/666; B29C 64/209; B33Y 10/00; B33Y 30/00; B33Y 40/00; B33Y 99/00
See application file for complete search history.

(56) References Cited

U.S. PATENT DOCUMENTS

| | | | | |
|---|---|---|---|---|
| 4,756,682 | A * | 7/1988 | Blaise | B29C 47/0023 425/113 |
| 5,221,541 | A * | 6/1993 | Arbour | B29C 47/003 264/176.1 |
| 5,267,847 | A * | 12/1993 | Bohm | B29C 47/0019 366/147 |
| 5,622,216 | A * | 4/1997 | Brown | B22D 11/00 164/71.1 |
| 5,968,561 | A * | 10/1999 | Batchelder | B29C 41/36 425/375 |
| 6,238,613 | B1 | 5/2001 | Batchelder | |
| 6,428,297 | B1 * | 8/2002 | Myer | B29C 47/0004 425/325 |
| 6,869,559 | B2 | 3/2005 | Hopkins | |
| 7,291,002 | B2 | 11/2007 | Russel | |
| 7,766,641 | B2 | 8/2010 | Silverbrook | |
| 8,827,687 | B2 | 9/2014 | Schumacher | |
| 8,905,742 | B2 | 12/2014 | Knighton | |
| 8,944,802 | B2 | 2/2015 | Patterson | |
| 9,138,940 | B2 | 9/2015 | Post | |
| 2002/0167103 | A1 * | 11/2002 | Ickinger | B28B 3/206 264/40.1 |
| 2006/0105072 | A1 * | 5/2006 | Hughes | B29C 47/08 425/131.1 |
| 2008/0089969 | A1 * | 4/2008 | Diaconu | B29C 45/20 425/261 |
| 2009/0295032 | A1 | 12/2009 | Hopkins | |
| 2011/0196660 | A1 | 8/2011 | Liu | |
| 2013/0306686 | A1 * | 11/2013 | Manner | B29C 45/27 222/591 |
| 2014/0159284 | A1 * | 6/2014 | Leavitt | B29C 67/0055 264/401 |
| 2014/0242208 | A1 | 8/2014 | Elsworthy | |
| 2014/0322383 | A1 | 10/2014 | Rutter | |
| 2014/0328963 | A1 * | 11/2014 | Mark | B29C 67/0088 425/143 |
| 2014/0328964 | A1 * | 11/2014 | Mark | B29C 67/0088 425/166 |
| 2014/0333011 | A1 | 11/2014 | Javidan | |
| 2015/0084222 | A1 | 3/2015 | Heston | |
| 2015/0099025 | A1 * | 4/2015 | Spalt | B29C 67/0088 425/166 |
| 2015/0140147 | A1 | 5/2015 | Konstantinos | |
| 2015/0140158 | A1 | 5/2015 | Cervantes | |
| 2015/0147427 | A1 * | 5/2015 | Lundwall | B29C 67/0085 425/375 |
| 2015/0174824 | A1 | 6/2015 | Gifford | |
| 2015/0183161 | A1 | 7/2015 | Malinari | |
| 2015/0231830 | A1 | 8/2015 | Tsai | |
| 2015/0239165 | A1 * | 8/2015 | Huang | B33Y 30/00 425/166 |
| 2015/0375451 | A1 | 12/2015 | Voris | |
| 2016/0046081 | A1 | 2/2016 | Kim | |
| 2016/0067928 | A1 * | 3/2016 | Mark | B29C 67/0088 264/401 |
| 2016/0145404 | A1 * | 5/2016 | Ackermann | B29C 47/0023 428/36.5 |
| 2016/0200024 | A1 * | 7/2016 | Kim | B29C 47/0803 425/143 |
| 2016/0236408 | A1 * | 8/2016 | Wolf | B29C 67/0055 |
| 2016/0263822 | A1 * | 9/2016 | Boyd, IV | B33Y 10/00 |
| 2017/0217088 | A1 * | 8/2017 | Boyd, IV | B29C 67/0055 |
| 2017/0348911 | A1 * | 12/2017 | Bruggeman | B29C 64/209 |

* cited by examiner

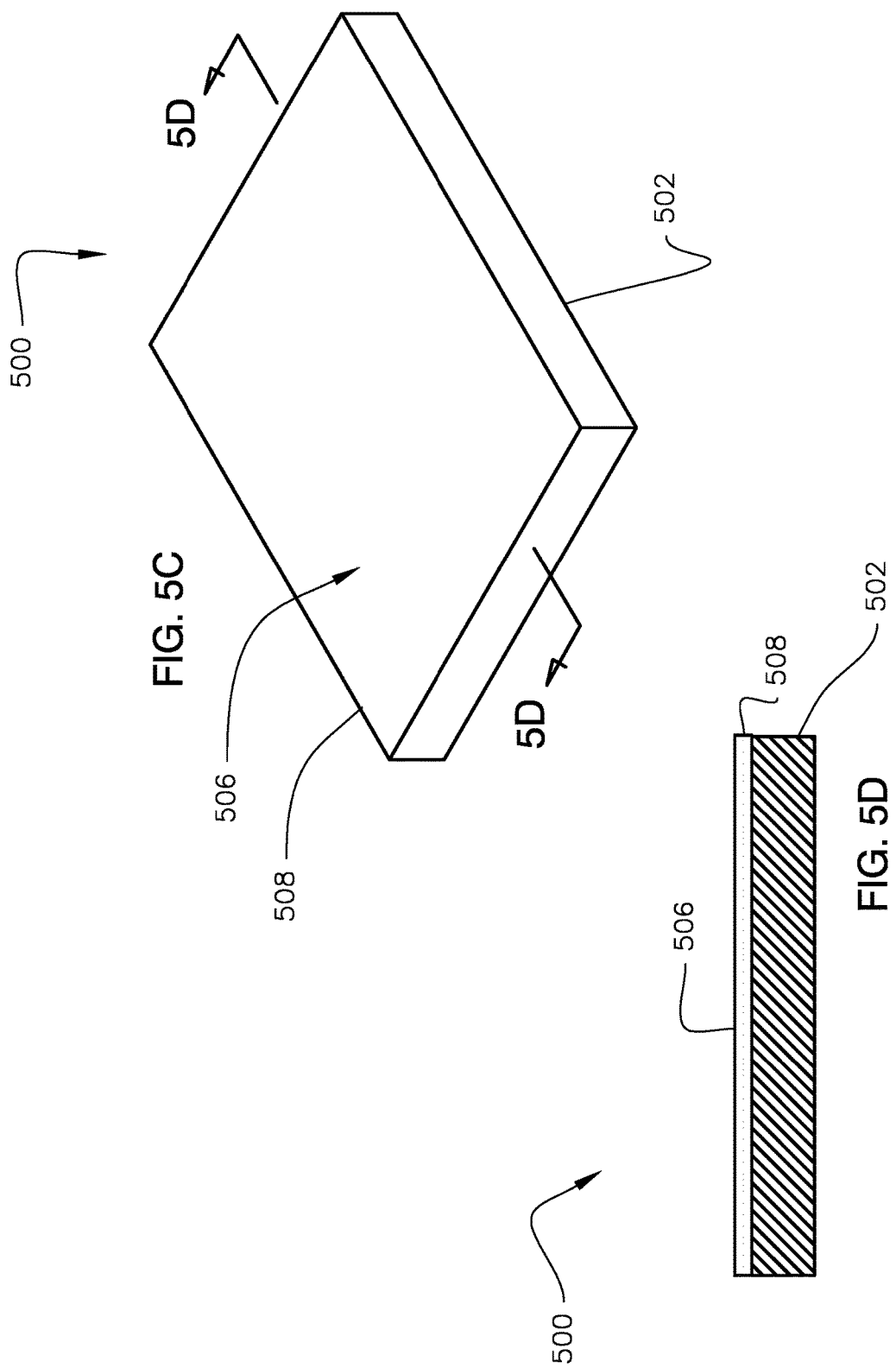

PRINTER FOR THREE DIMENSIONAL PRINTING

PRIORITY NOTICE

The present application claims priority under 35 U.S.C. § 119(e) to U.S. Provisional Patent Application Ser. No. 62/165,132 filed on May 21, 2015, the disclosure of which is incorporated herein by reference in its entirety.

TECHNICAL FIELD OF THE INVENTION

The present invention relates in general to printers for three dimensional printing and more specifically to fused deposition modeling (FDM) printers and fused filament modeling (FFM) printers.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Presently (circa 2016) printers for three dimensional (3D) printer, such as FDM (fused deposition modeling) printers and FFM (fused filament modeling) printers suffer from a number of problems, particularly such smaller printers that are intended to operate upon a desk or tabletop. These problems lead to excessive setup times before 3D printing may be initiated, frequent downtime dealing with jams, cleaning, and/or re-calibration problems. Presently, these problems lead to reliability problems of 3D printing a given 3D object; and these problems lead to repeatability problems for 3D printing a same type of part over two or more production runs.

For example, present prior art extrusion chambers where a given portion of a filament is to be melted have insufficient temperature controls within the given extrusion chamber and problems in a filament pathway geometry through the given extrusion chamber. These problems with improper temperature control and improper filament pathway geometry lead to frequent and undesirable jams of filament material in the filament pathway within the given extrusion chamber. In prior art extrusion chambers, a hot end region is not properly sealed against liquid filament that cools, hardens, and results in blocked filament pathways, i.e., results in jams. That is, when a solid filament is liquefied in a melt chamber, some of this hot liquid filament material migrates upwards (due to pressure and density differentials in the filament material), and as this hot filament material that migrates upward, into cooler regions of the filament pathway, this material then cools, hardens, and creates blockages in the filament pathway. It would be desirable for an extrusion chamber to have proper temperature controls and proper filament pathway geometry to minimize jams and produce a controlled and consistent extrudate. It would be desirable for an extrusion chamber that minimizes and/or prevents against upward moving hot liquid filament material cooling and forming blockages.

Additionally, prior art filament feeding systems for FDM (FFM) printers also create problems. Presently these filament feeding systems grip and move the filament along via use of grooves, teeth, ribs, or knurling. Because filament materials are often softer than these grooves, teeth, ribs, or knurling, filament handling by such means encourages breakage of the filament resulting in downtime to reload the filament. Filament handling by such means also generates excessive filament dust and filament splinters which may clog various mechanical components, again resulting in undesirable downtime. Filament handling by such means also introduces imperfections to surface geometry of the filament, which may lead to jamming problems in the extrusion chamber and/or to inconsistencies in outputted extrudate. It would be desirable to handle movement of the filament in a way that does not encourage filament breakage, does not generate excessive filament dust or filament splinters, and that does not leave surface imperfections of the surface geometry of the filament.

Additionally, many prior art FDM (FFM) printers suffer from problems with slippage of extrudate and the receiving work surface. It would be desirable to layer extrudate upon the work surface in a manner with minimal slippage; yet, when the 3D printing run is done and the extrudate is hardened and/or cooled, that the 3D printed object may be readily removed from such a work surface without breaking the 3D printed object or without excessive intervening removal steps being utilized.

Additionally, many prior art FDM (FFM) printers suffer from tolerance stacking problems, particularly arising from how x-axis positioning systems, y-axis positioning systems, and z-axis positioning systems are attached to different and diverse structures within the prior art FDM (FFM) printers such that the cumulative tolerance stacking means those prior art FDM (FFM) printers must always have certain repeatability problems, requiring excessive calibration and/or alignment processes. In order to minimize such cumulative tolerance stacking problems, it would be desirable to minimize the different and diverse structures that the x-axis positioning systems, y-axis positioning systems, and z-axis positioning systems are attached to. In order to minimize such cumulative tolerance stacking problems, it would be desirable to utilize a common plane for attachment of the various axis positioning systems.

Similarly, prior art FDM (FFM) printers suffer from tolerance stacking problems associated with utilizing at least two z-axis guides; in that a mechanical fit between a given z-axis guides and its complimentary receiving sleeve must entail some level of mechanical fit tolerance; and for each such pairing of z-axis guide with complimentary receiving sleeve, cumulative tolerance stacking problems arise. Ideally, one wants a top surface (i.e., a working surface) of a build plate to be parallel with an x-y plane that the extrusion core moves in. However, in practice there must some degree of "wobble," i.e., angles of offset between a plane of the top surface and the x-y plane. This wobble arises due to mechanical fit tolerances between z-axis guides and complimentary receiving sleeves that the given z-axis guides slides in. Prior art FDM (FFM) printers utilize two or more (e.g., two to four) such z-axis guides; and thus, two or more such complimentary receiving sleeves. Two or more z-axis guides are used, because if one z-axis guide was used, an expected location would be at a center of the build plate; however, locating a single z-axis guide at the center would also be in the center of the work surface and thus a centrally located single z-axis guide would get in the way of the printing. Thus prior art FDM (FFM) printers locate the z-axis guides off-center from the build plate; which then means the build plate may be acting as a lever arm upon an off-center z-axis guide; and to accommodate for that, prior art FDM (FFM) printers utilize at least two z-axis guides and sometimes three to four z-axis guides; which helps to distribute load from the build plate. But whenever two or more z-axis guides are used, the problem of mechanical fit tolerance stacking arises from each given z-axis guide and its complimentary receiving sleeve. The more z-axis guides, the more wobble. Wobble may be reduced by minimizing mechanical fit tolerances between the given z-axis guide and its complimentary receiving sleeve. But reducing such mechanical fit tolerances increases manufacturing costs. But even with reduced mechanical fit tolerances, there must be some mechanical fit tolerance; and thus tolerance stacking problems if two or more z-axis guides are used. Additionally, when two or more z-axis guides are used, an additional tolerance stacking problem is introduced with respect to a location of second or more complimentary receiving sleeves. Thus it would be desirable to minimize such mechanical fit tolerance stacking problems and utilize a single z-axis guide for the build plate.

There is a need in the art for a FDM (FFM) printer, which may be a desktop or tabletop printer, wherein the FDM (FFM) printer addresses these problems resulting in optimized reliability and repeatability of extrusion for progressive layering of extrudate to form a 3D printed object. That is, there is a need on the art for a FDM (FFM) printer that improves both reliability and repeatability of 3D extrudate layer printing.

It is to these ends that the present invention has been developed.

BRIEF SUMMARY OF THE INVENTION

To minimize the limitations in the prior art, and to minimize other limitations that will be apparent upon reading and understanding the present specification, the present invention describes printers for three dimensional (3D) printing of objects with acceptable reliability and repeatability. Such 3D printers may comprise one or more of: an extrusion core with particularized temperature controls; an extrusion core with particularized filament pathway geometry; an extrusion core with a nozzle that is integral with a heating block; a filament feeding system using smooth-faced-rollers; a build plate with an adhesion-layer for wetting between the extrudate and the adhesion-layer; an alignment-plane for anchoring axis positioning systems to a common plane to minimize tolerance stacking problems; and a single z-axis guide, a mono-rail, for guiding movement of a build plate in the z-axis direction, which may permit use of minimal mechanical fit tolerances between the mono-rail and a complimentary receiving sleeve, which in turns translates into improved 3D printing reliability and repeatability, including with respect to layer height precision.

In some embodiments of the present invention, the printer may optimize reliability and repeatability of extrusion for progressively layering of the extrudate to form a given 3D printed object. In some embodiments, the printer may operatively connect to a computer program that controls filament feeding, extrusion rate, and/or layering coordinates. In some embodiments, the printer may provide multiple unique components that work together to create a synergy for optimal 3D printing.

It is an objective of the present invention to provide a printer for three dimensional (3D) printing (hereinafter, "printer"); wherein this printer includes an extrusion core with proper temperature control of the filament-pathway within the given extrusion core.

It is another objective of the present invention to provide a printer with an extrusion core with proper temperature control of the filament-pathway within the given extrusion core; wherein such proper temperature control may comprise one or more of: a hot end, a transition-section, and a cool end.

It is another objective of the present invention to provide a printer with an extrusion core with proper temperature control of the filament-pathway within the given extrusion core; wherein such proper temperature control may comprise one or more of: block heaters and insulators.

It is another objective of the present invention to provide a printer with an extrusion core with proper temperature control of the filament-pathway within the given extrusion core; wherein such proper temperature control may comprise one or more of: a block heater integral with a nozzle. An integral nozzle with block heater may also minimize leakage problems associated with nozzles that are non-integral to a heater.

It is another objective of the present invention to provide a printer that includes an extrusion core with proper surface geometry of the filament-pathway within the given extrusion core.

It is another objective of the present invention to provide a printer that includes an extrusion core with proper surface geometry of the filament-pathway within the given extrusion core, which may include an elongated-melt-chamber.

It is another objective of the present invention to provide a printer that includes an extrusion core with proper surface geometry of the filament-pathway within the given extrusion core, which may include a diverging-converging-chamber.

It is another objective of the present invention to provide a printer with a filament feeding system that does not include grooves, teeth, ribs, or knurling to grip the filament.

It is another objective of the present invention to provide a printer with a filament feeding system wherein at least a portion of the filament feeding system may be enclosed to prevent contamination, such as by from dust build up on the filament and it feeding components.

It is another objective of the present invention to provide a printer with an adhesion-layer upon a top portion of a build plate; wherein the adhesion-layer permits wetting as between the received filament extrudate from a nozzle and the adhesion-layer; wherein such wetting may minimize slippage as between the received extrudate and the adhesion-layer.

It is another objective of the present invention to provide a printer with a common alignment-plane for anchorage of elements of various axis positioning systems to minimize tolerance stacking problems.

It is yet another objective of the present invention to provide a single z-axis guide, i.e., a mono-rail, as opposed to two or more such z-axis guides; such that a tighter mechanical fit between the z-axis guide and its complimentary receive sleeve may be utilized as compared to printers using two or more z-axis guides.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 5C may depict an embodiment of a build plate subassembly, shown from a perspective view. Also in FIG. 5C sectional-line 5D-5D is shown.

FIG. 5D may depict a cross-sectional view of the build plate subassembly of FIG. 5C; wherein the cross-section is along sectional-line 5D-5D that is shown in FIG. 5C.

Figure 1A:
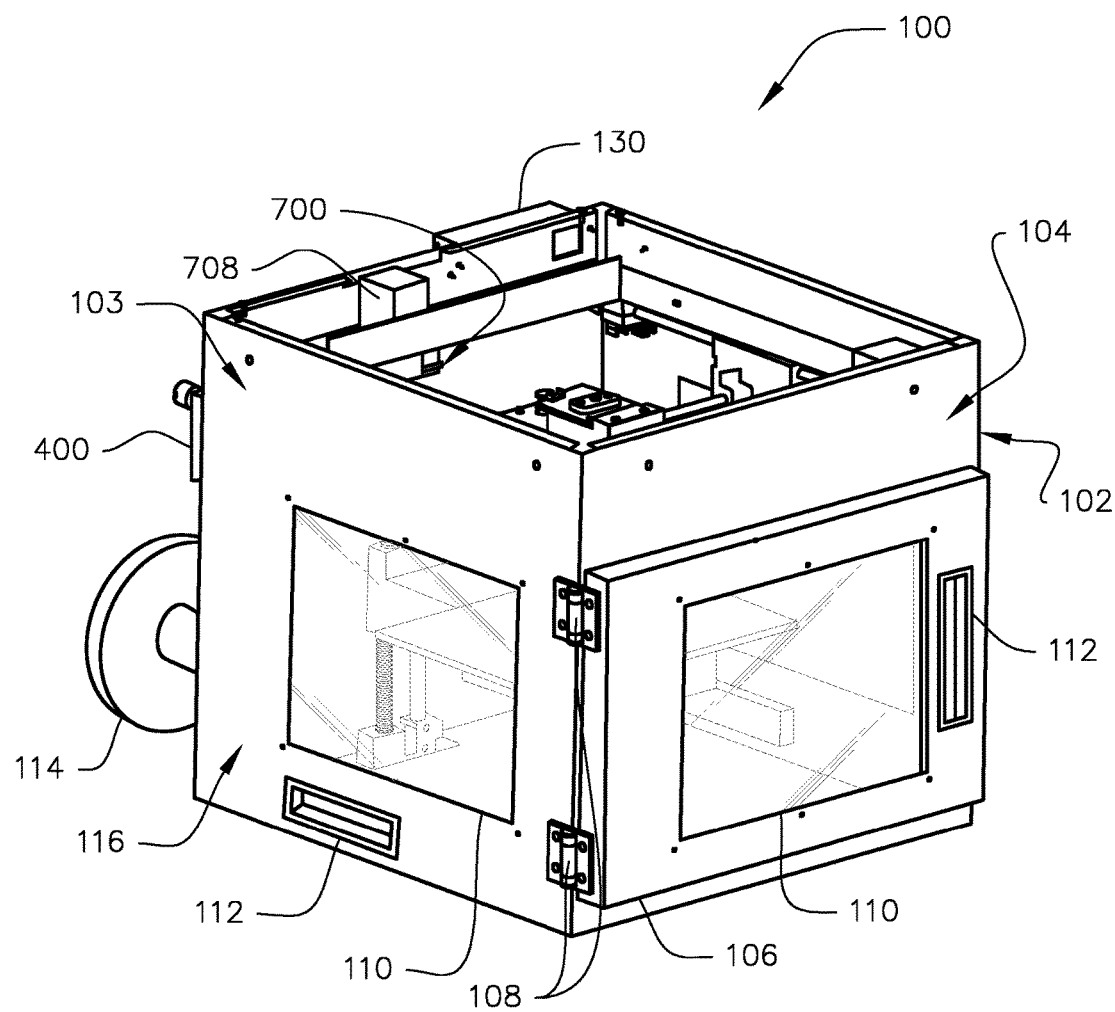
FIG. 1A may depict an embodiment of a printer for three dimensional printing, shown from a perspective view.

REFERENCE NUMERAL SCHEDULE 100 printer 100
102 structure 102
103 member 103
104 front 104
106 door 106
108 hinge 108
110 window 110
112 handle 112
114 filament-spool 114
116 left-side 116
118 right-side 118
120 bottom 120
122 foot 122
124 back 124

130 electronics housing 130
210 separation-gap 210
300 extrusion core 300
302 elongate-volume 302
304 filament-pathway 304
310 hot-end 310
312 distal-end 312
314 first-temperature-controlled-block 314
316 melt-chamber 316
318 nozzle 318
319 orifice-opening 319
330 transition-section 330
332 first-insulator 332
334 second-temperature-controlled-block 334
340 diverging-converging-chamber 340
342 first-cross-section-size 342
344 maximum-cross-section 344
346 second-cross-section-size 346
350 cool-end 350
352 second-insulator 352
354 one-end 354
400 filament-feeding-system 400
402 smooth-faced-roller 402
404 groove 404
406 smooth surfaces 406
408 predetermined-distance 408
410 rotational-motive-means 410
412 lid 412
414 base 414
416 fastener 416
417 resistance means 417
418 fastener-receiver 418
420 exit-port 420
500 build plate subassembly 500
502 build plate 502
504 bed 504
506 top surface 506
508 adhesion-layer 508
600 alignment-plane 600
602 planar-member 602
604 central major hole 604
606 minor hole 606
612 y-axis motive means 612
616 linkage-belt 616
618 y-axis drive shaft 618
620 y-axis belt 620
622 y-axis guide 622
624 y-slider 624
632 central-carriage 632
634 x-axis motive means 634
636 x-axis guide 636
638 x-axis belt 638
650 z-axis tie-end 650
700 z-axis positioning system 700
702 mono-rail 702
704 mono-rail-sleeve 704
706 z-axis positioner 706
708 z-axis motive means 708
710 bottom-anchor 710
714 top-anchor 714
718 stop 718
802A transverse width cross-section 802A of mono-rail 702
802B transverse width cross-section 802B of mono-rail 702
802C transverse width cross-section 802C of mono-rail 702
802D transverse width cross-section 802D of mono-rail 702
802E transverse width cross-section 802E of mono-rail 702
802F transverse width cross-section 802F of mono-rail 702
802G transverse width cross-section 802G of mono-rail 702
9001 filament 9001

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "right," "front," "back" ("rear"), "bottom," "top," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
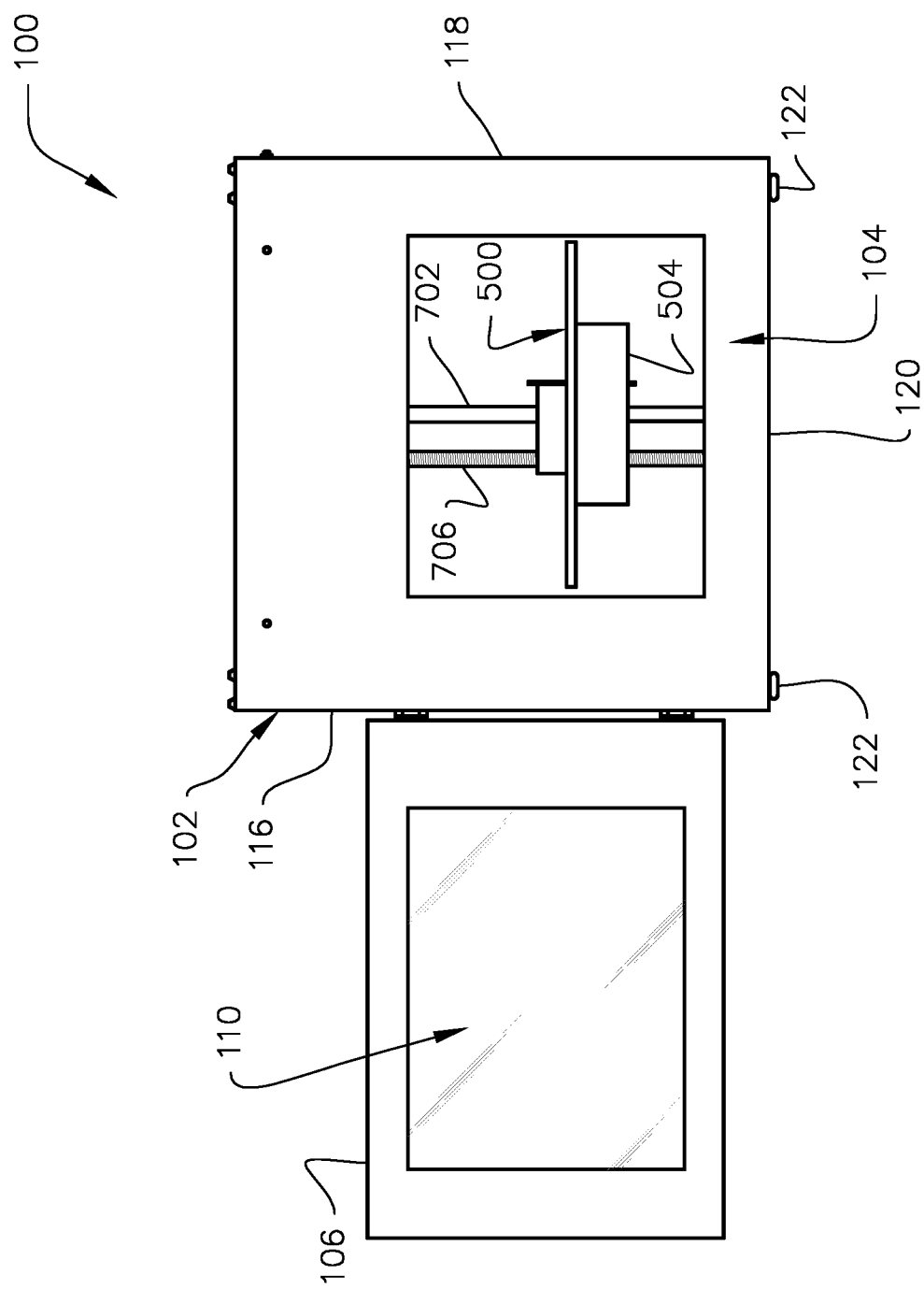
FIG. 1B may depict the printer for three dimensional printing of FIG. 1A, shown from a front view and with a door open.
Figure 1C:
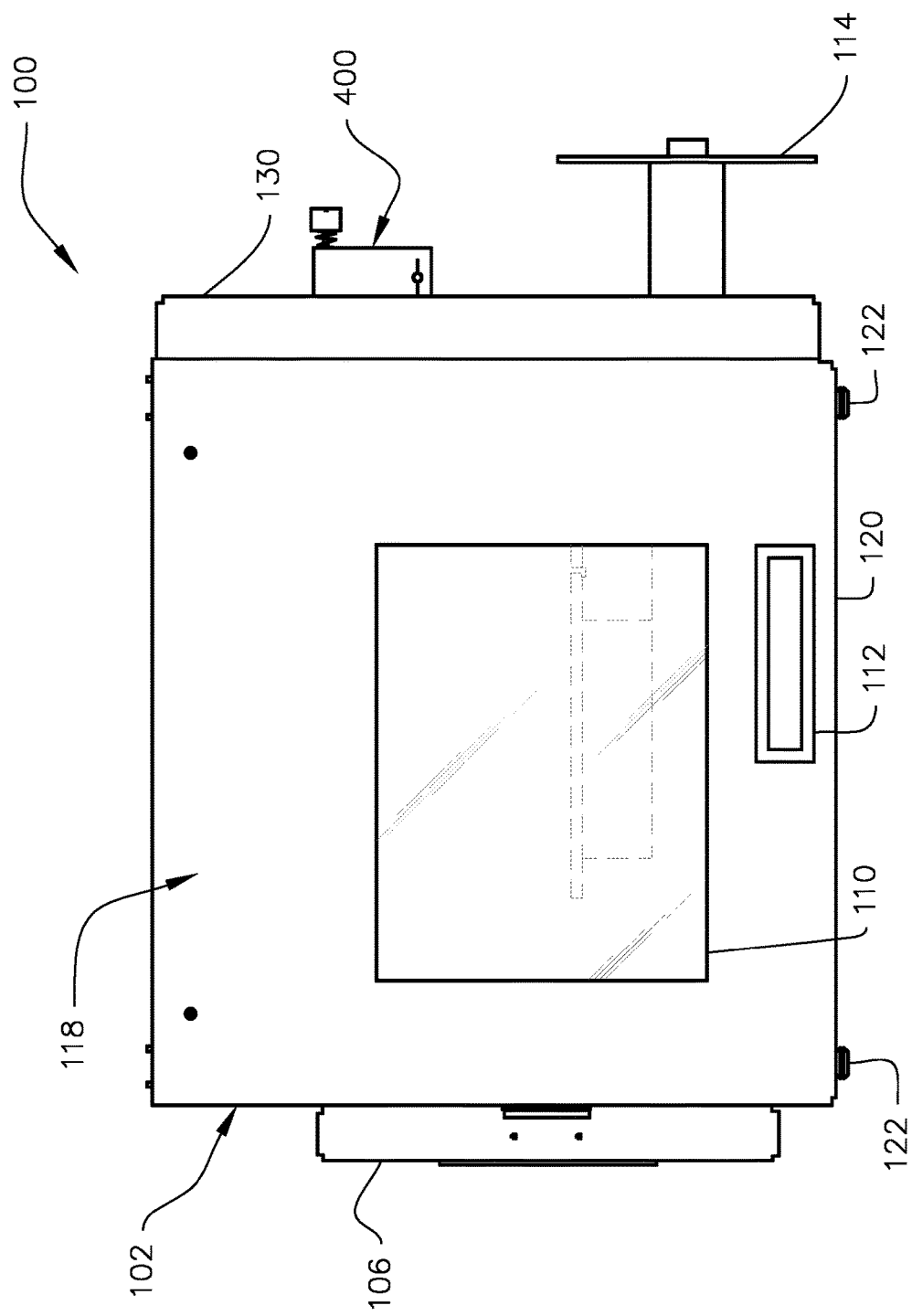
FIG. 1C may depict the printer for three dimensional printing of FIG. 1A, shown from a right view.
Figure 1D:
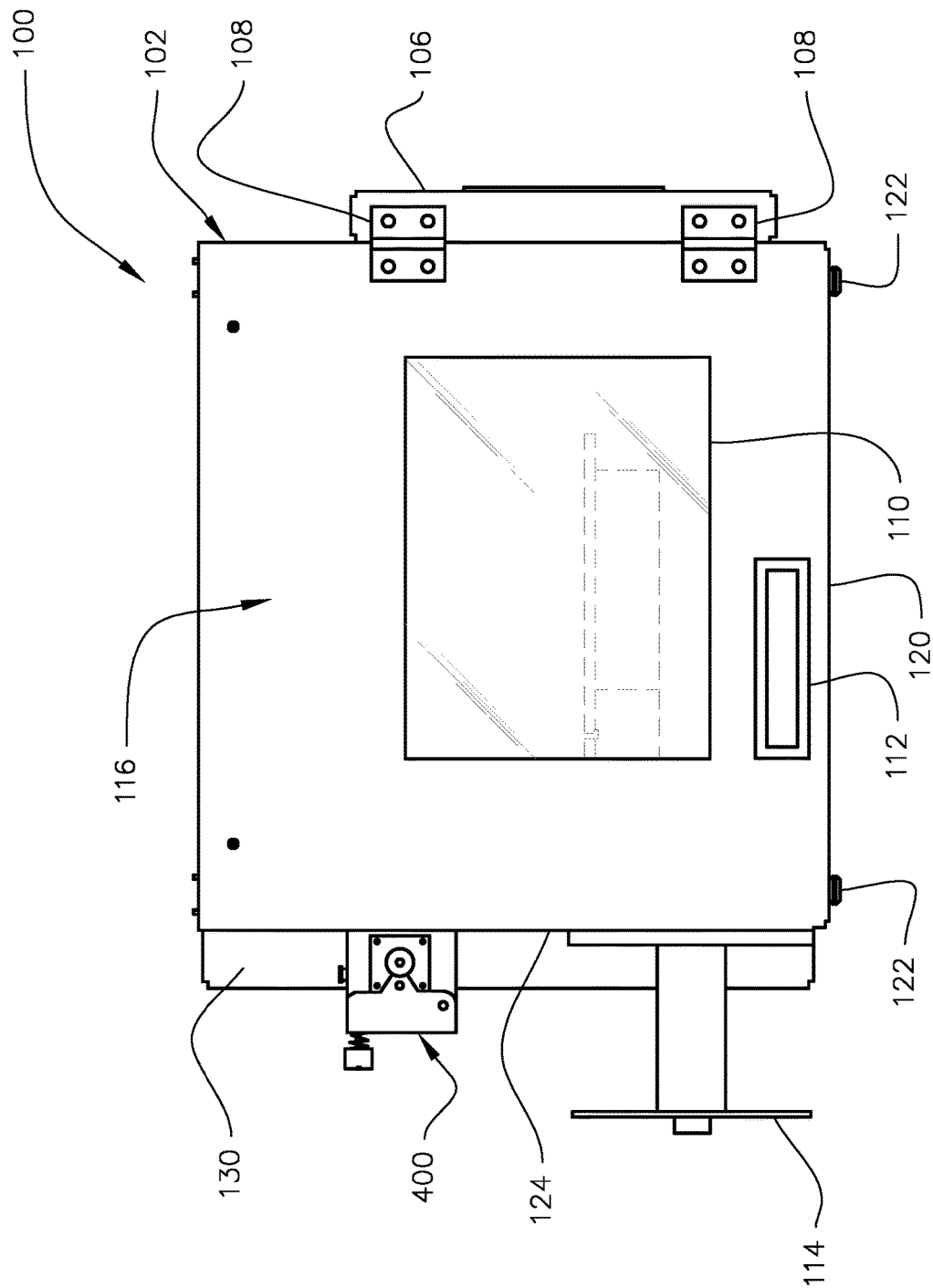
FIG. 1D may depict the printer for three dimensional printing of FIG. 1A, shown from a left view.
Figure 1E:
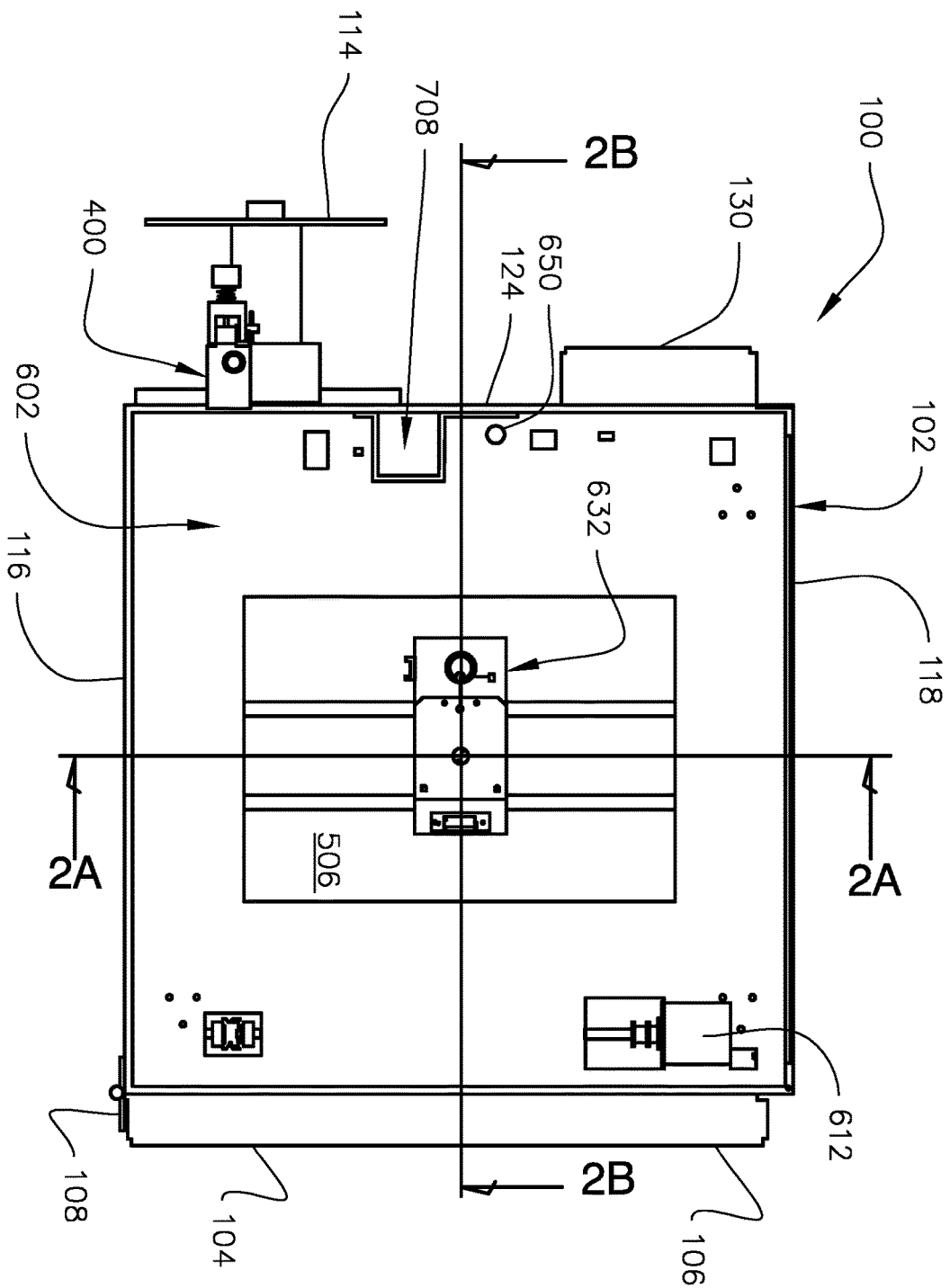
FIG. 1E may depict the printer for three dimensional printing of FIG. 1A, shown from a top view. Also in FIG. 1E, two perpendicular sectional-lines are shown, sectional-line 2A-2A and sectional-line 2B-2B.
Figure 1F:
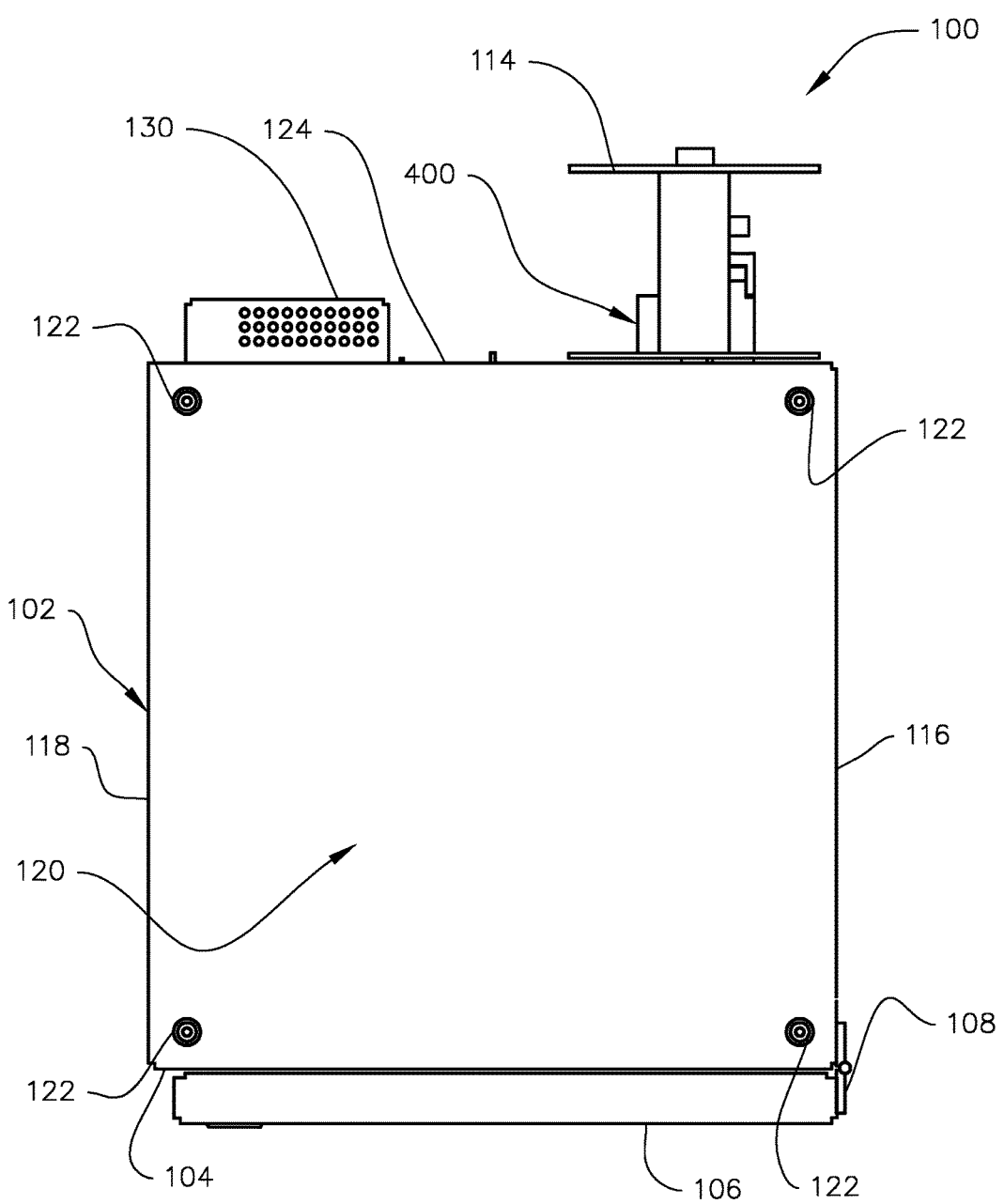
FIG. 1F may depict the printer for three dimensional printing of FIG. 1A, shown from a bottom view.
Figure 1G:
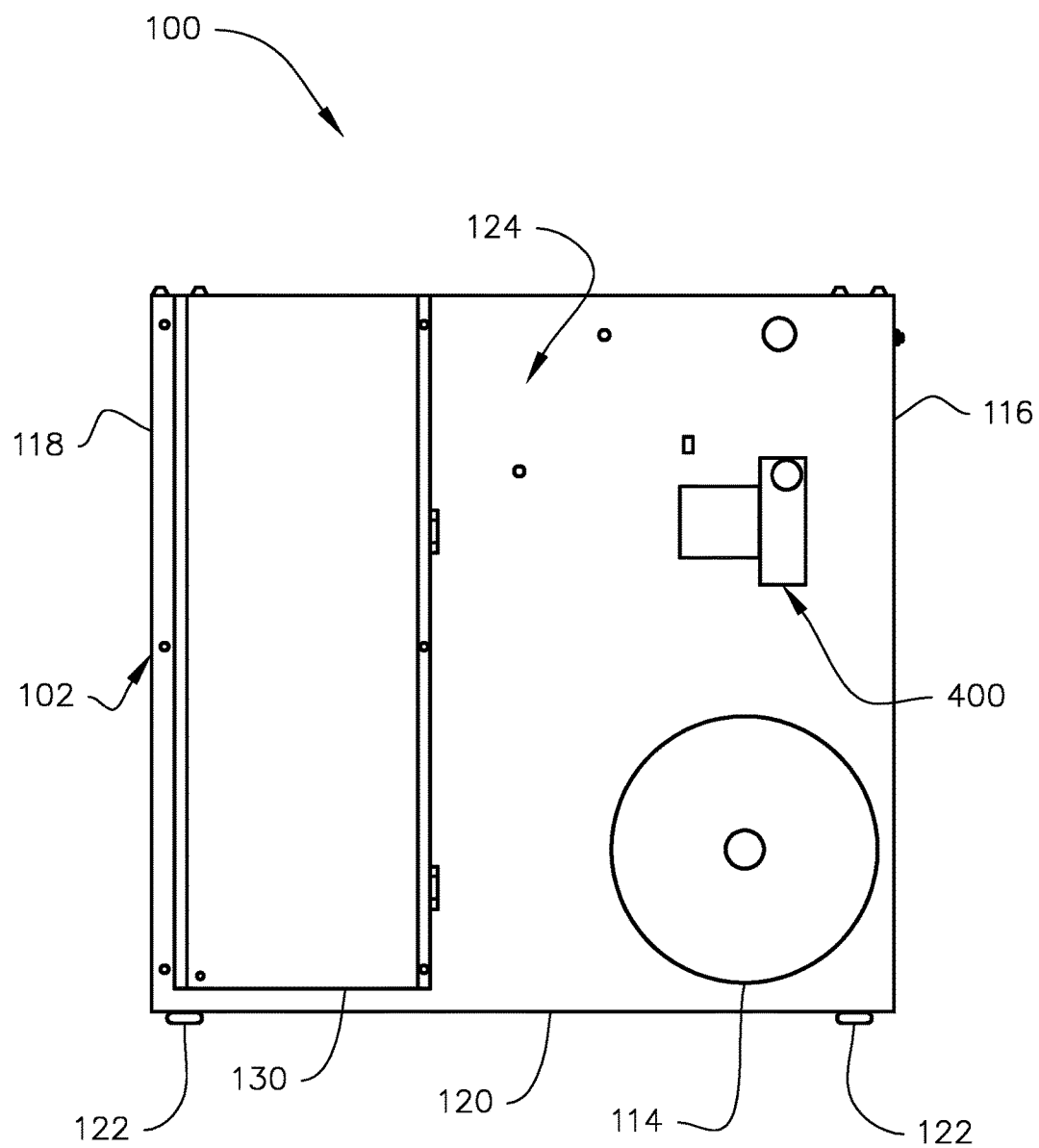
FIG. 1G may depict the printer for three dimensional printing of FIG. 1A, shown from a back view.

A FIG. 1 series of figures may comprise FIG. 1A through and including FIG. 1G. These FIG. 1 series of figures may depict an embodiment of a printer for three dimensional (3D) printing; hereinafter, printer 100. In particular, these FIG. 1 series of figures may depict printer 100 from various external views.

FIG. 1A may depict printer 100, shown from a perspective view (specifically from a top, left, and front perspective view). FIG. 1B may depict printer 100, shown from a front view and with a door 106 open. FIG. 1C may depict printer 100, shown from a right view. FIG. 1D may depict printer 100, shown from a left view. FIG. 1E may depict printer 100, shown from a top view. Also in FIG. 1E, two perpendicular sectional-lines are shown, sectional-line 2A-2A and sectional-line 2B-2B. (See FIG. 2A and FIG. 2B, respectively for the views resulting from these sectional-lines.) FIG. 1F may depict printer 100, shown from a bottom view. FIG. 1G may depict printer 100, shown from a back view.

In some embodiments, printer 100 may comprise structure 102. See e.g., FIG. 1A. In some embodiments, structure 102 may be a structure for providing one or more of: a structural framework for at least some mechanical and/or electrical components of printer 100 to attach to; a protective barrier for at least some mechanical and/or electrical components of printer 100; a means to delineate printer 100 from its environment; and the like. For example, and without limiting the scope of the present invention, in some embodiments, structure 102 may be a housing for printer 100. In some embodiments, structure 102 may be comprised of one or more members 103. See e.g., FIG. 1A. For example, and without limiting the scope of the present invention, in some embodiments, one or more members 103 may comprise a front 104 member, a left-side 116 member, a right-side 118 member, a bottom 120 member, and a back 124 member. See e.g., FIG. 1A for front 104 member, left-side 116 member; FIG. 1C for right-side 118 member; FIG. 1F for bottom 120 member; and FIG. 1G for back 124 member. In some embodiments, each such member may be in communication with three other members. In some embodiments, these members may be in communication such that an interior major volume of printer 100 may be substantially enclosed on at least five sides. See e.g., the FIG. 1 series of figures in general.

In some embodiments, the interior major volume of printer 100 may be where a z-axis positioning system 700 may be located. See e.g., a FIG. 7 series of figures for z-axis positioning system 700. In some embodiments, the interior major volume of printer 100 may be where a build plate subassembly 500 may be located. See e.g., a FIG. 5 series of figures for build plate subassembly. A top surface 506 of a build plate 502 or of an adhesion-layer 508 may be wear a given 3D part may be built, layer by layer from printing of printer 100. In some embodiments, this interior major volume of printer 100 may be accessed via door 106. In some embodiments, front 104 member may comprise door 106. See e.g., FIG. 1B, where door 106 may be open and showing portions of the interior major volume. For example, in FIG. 1B, portions of a mono-rail 702, a z-axis positioner 706, and build plate subassembly 500 may be seen in this interior major volume. In some embodiments, door 106 may be attached to structure 102 (or attached to a given member 103) by one or more hinges 108. See e.g., FIG. 1A. In some embodiments, door 106 may comprise a window 110. See e.g., FIG. 1A and FIG. 1B. In some embodiments, window 110 may be substantially transparent. In some embodiments, window 110 may permit a given user to see portions of the interior major volume; such as portions of mono-rail 702, z-axis positioner 706, and build plate subassembly 500. In some embodiments, door 106 may comprise a handle 112. See e.g., FIG. 1A. Handle 112 in door 106 may facilitate opening and closing of door 106.

In some embodiments, left-side 116 member may comprise a window 110. See e.g., FIG. 1A and FIG. 1D. This window 110 may serve similar functions and purposes as window 110 in door 106. This window 110 in left-side 116 member may have similar properties as window 110 in door 106. In some embodiments, left-side 116 member may comprise a handle 112. See e.g., FIG. 1A and FIG. 1D. This handle 112 in left-side 116 member may be to facilitate moving printer 100.

In some embodiments, right-side 118 member may comprise a window 110. See e.g., FIG. 1C. This window 110 may serve similar functions and purposes as window 110 in left-side 116 member. This window 110 in right-side 118 member may have similar properties as window 110 in left-side 116 member. In some embodiments, right-side 118 member may comprise a handle 112. See e.g., FIG. 1C. This handle 112 in right-side 118 member may be to facilitate moving printer 100. In some embodiments, handles 112 on right-side 118 and on left-side 116 may be used together to move printer 100.

In FIG. 1E a top of an alignment-plane 600 may be seen and in particular that of planar-member 602 may be seen; wherein in some embodiments, alignment-plane 600 may comprise planar-member 602. See a FIG. 6 series of figures for alignment-plane 600. In some embodiments, alignment-plane 600 may be attached to structure 102. In some embodiments, alignment-plane 600 may be attached to one or more members 103.

Note, a top member 103 of printer 100 may not be shown in the figures. That is, FIG. 1E may omit such a top member 103. However, in intended operation of printer 100, structure 102 may comprise a top member 103 that may substantially cover the view of FIG. 1E.

In some embodiments, bottom 120 may comprise three or more feet 122. See e.g., FIG. 1F. In some embodiments, each such foot 122 may minimize slippage of printer 100 and a substrate that printer 100 may be resting upon. In some embodiments, each such foot 122 may permit levelling of printer 100. In some embodiments, each such foot 122 may dampen vibrations between printer 100 and the substrate that printer 100 may be resting upon.

In some embodiments, this substrate may be a desktop and/or a tabletop. That is, in some embodiments, printer 100 may be sized to fit onto a top of a desk and/or of at table.

In FIG. 1G, several components of some embodiments of printer 100 may be seen. In some embodiments, printer 100 may comprise one or more filament-spools 114. In FIG. 1G, filament-spool 114 may be attached to back 124 member. In other embodiments, filament-spools 114 may be attached to printer 100 in different locations, such as other members 103 and/or inside of the interior major volume—these embodiments are not shown in the figures. In some embodiments, filament-spool 114 may be for receiving a coil of filament 9001.

In some embodiments, printer 100 may comprise one or more filament-feeding-system 400. In some embodiments, there may be a given filament-feeding-system 400 for each filament-spool 114. In FIG. 1G, filament-feeding-system 400 may be attached to back 124 member. In other embodiments, filament-feeding-system 400 may be attached to printer 100 in different locations, such as other members 103 and/or inside of the interior major volume—these embodiments are not shown in the figures.

In some embodiments, printer 100 may comprise one or more electronics housing 130. In FIG. 1G, electronics housing 130 may be attached to back 124 member. In other embodiments, electronics housing 130 may be attached to printer 100 in different locations, such as other members 103 and/or inside of the interior major volume—these embodiments are not shown in the figures. In some embodiments, electronics housing 130 may house various electronic components of printer 100, such as, but not limited to, circuits, processors, memory, network card, radio, and the like. In some embodiments, electronics housing 130 may comprise one or more ventilation holes. In some embodiments, electronics housing 130 may comprise one or more cabling and/or wiring ports.

Note, in some embodiments, front 104, left-side 116, right-side 118, bottom 120, and back 124 may refer to indicated sides of printer 100.

In some embodiments, structure 102 and/or members 103 may be substantially rigid. In some embodiments, structure 102 and/or members 103 may be substantially constructed from one or more metals and/or thermoformed plastics. In some embodiments, structure 102 and/or members 103 may be substantially constructed from sheet metal.

Figure 2A:
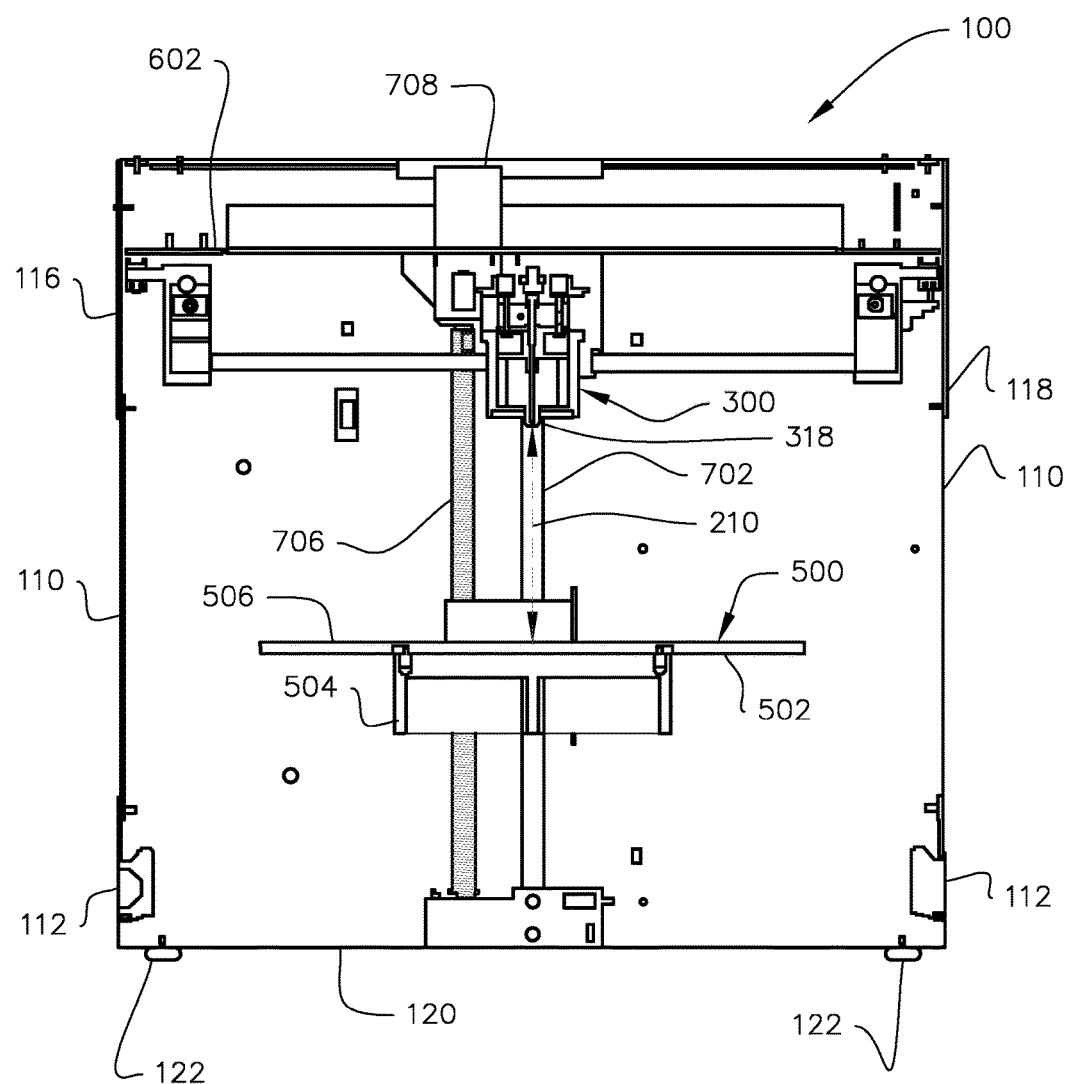
FIG. 2A may depict a cross-sectional view of the printer for three dimensional printing of FIG. 1A; wherein the cross-section is along sectional-line 2A-2A that is shown in FIG. 1E.
Figure 2B:
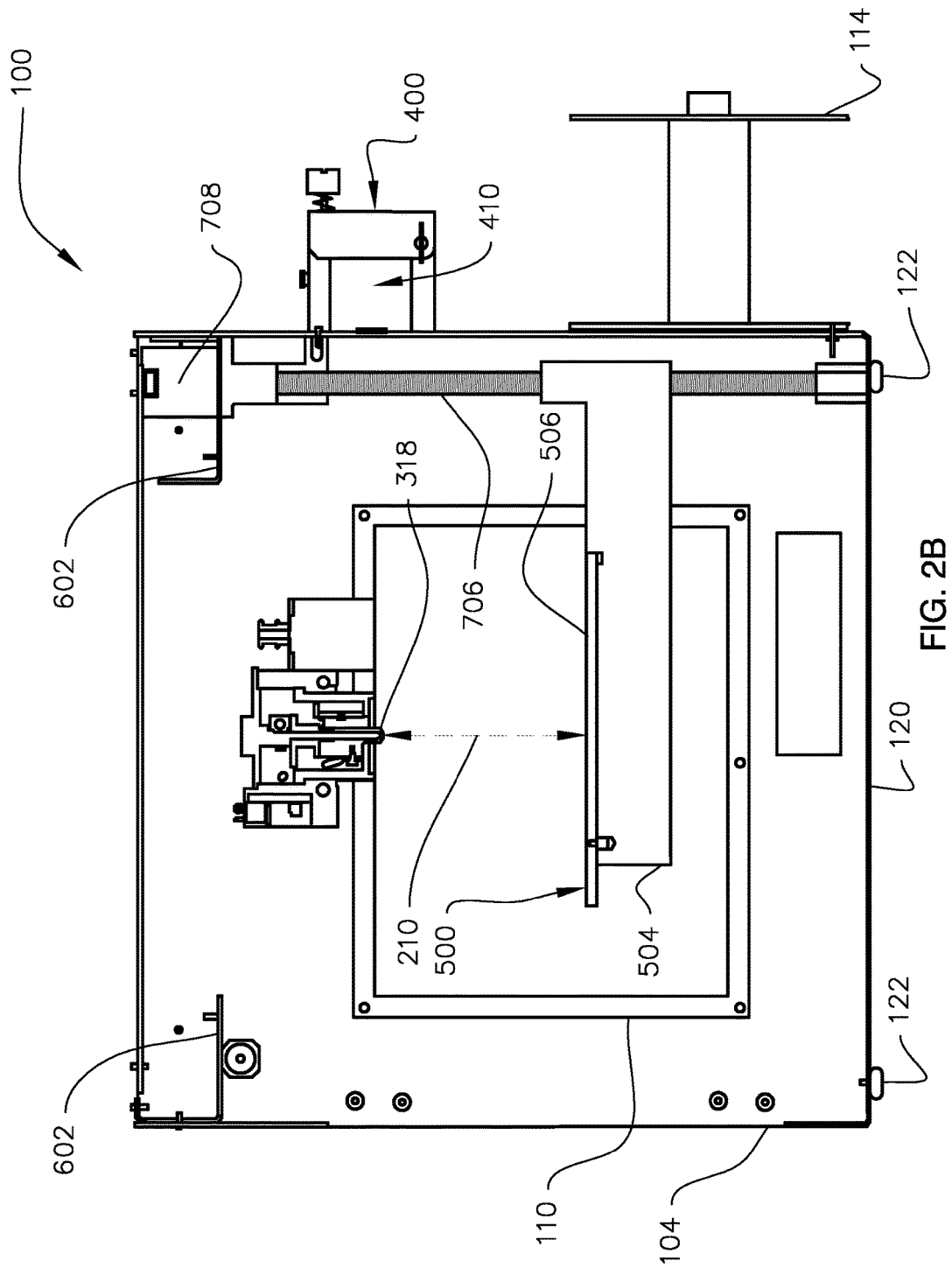
FIG. 2B may depict a cross-sectional view of the printer for three dimensional printing of FIG. 1A; wherein the cross-section is along sectional-line 2B-2B that is shown in FIG. 1E.
Figure 2C:
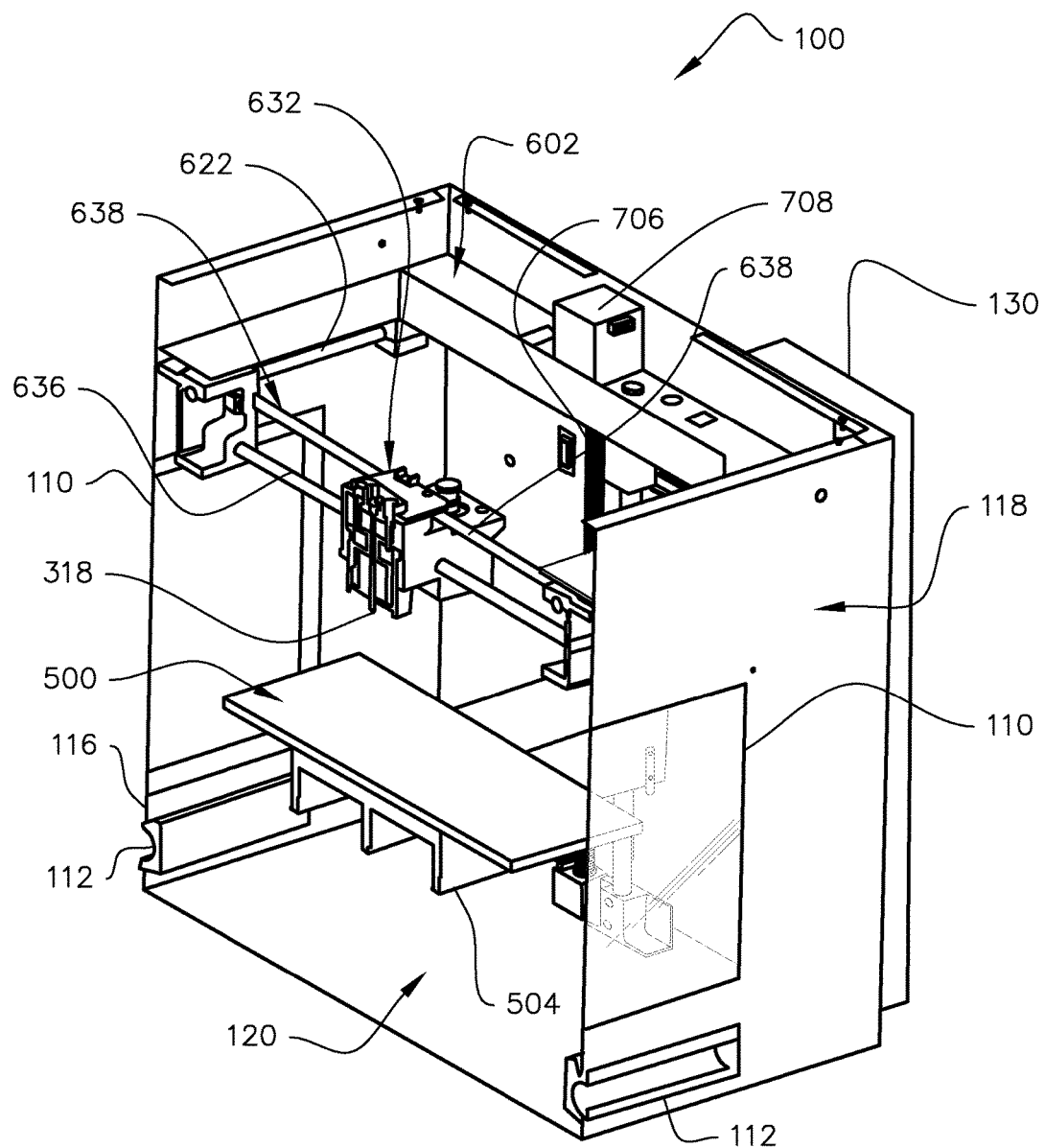
FIG. 2C may be perspective view of the cross-sectional view of FIG. 2A.

A FIG. 2 series of figures may comprise FIG. 2A through and including FIG. 2C. These FIG. 2 series of figures may depict cross-sectional views of printer 100. FIG. 2A may depict a cross-sectional view of printer 100; wherein the cross-section is along sectional-line 2A-2A that is shown in FIG. 1E. FIG. 2B may depict a cross-sectional view printer 100; wherein the cross-section is along sectional-line 2B-2B that is shown in FIG. 1E. FIG. 2C may be perspective view of the cross-sectional view of FIG. 2A. These three cross-sectional views may generally show the interior major volume of printer 100. FIG. 2A and FIG. 2C may show portions of build plate subassembly 500, alignment-plane 600, and of z-axis positioning system 700. FIG. 2B may show different portions of build plate subassembly 500, alignment-plane 600, and of z-axis positioning system 700.

In FIG. 2A and in FIG. 2B, note separation-gap 210. In some embodiments, separation-gap 210 may be a distance between nozzle 318 and top surface 506. This separation-gap 210 is of course variable, as build plate 502 (or bed 504) may be varied in the z-axis direction, e.g., along mono-rail 702. Likewise, there is of course separation-gap 210 may be a predetermined minimum distance or a predetermined maximum distance. And likewise, the ability to control any given separation-gap 210 within its operational range, is critical to extrudate layering precision and accuracy. This is why it is desirable to reduce wobble (i.e., angles of offset) between a plane of top surface 506 and the x-y plane of planar-member 602, such as by using a single mono-rail 702.

Figure 3:
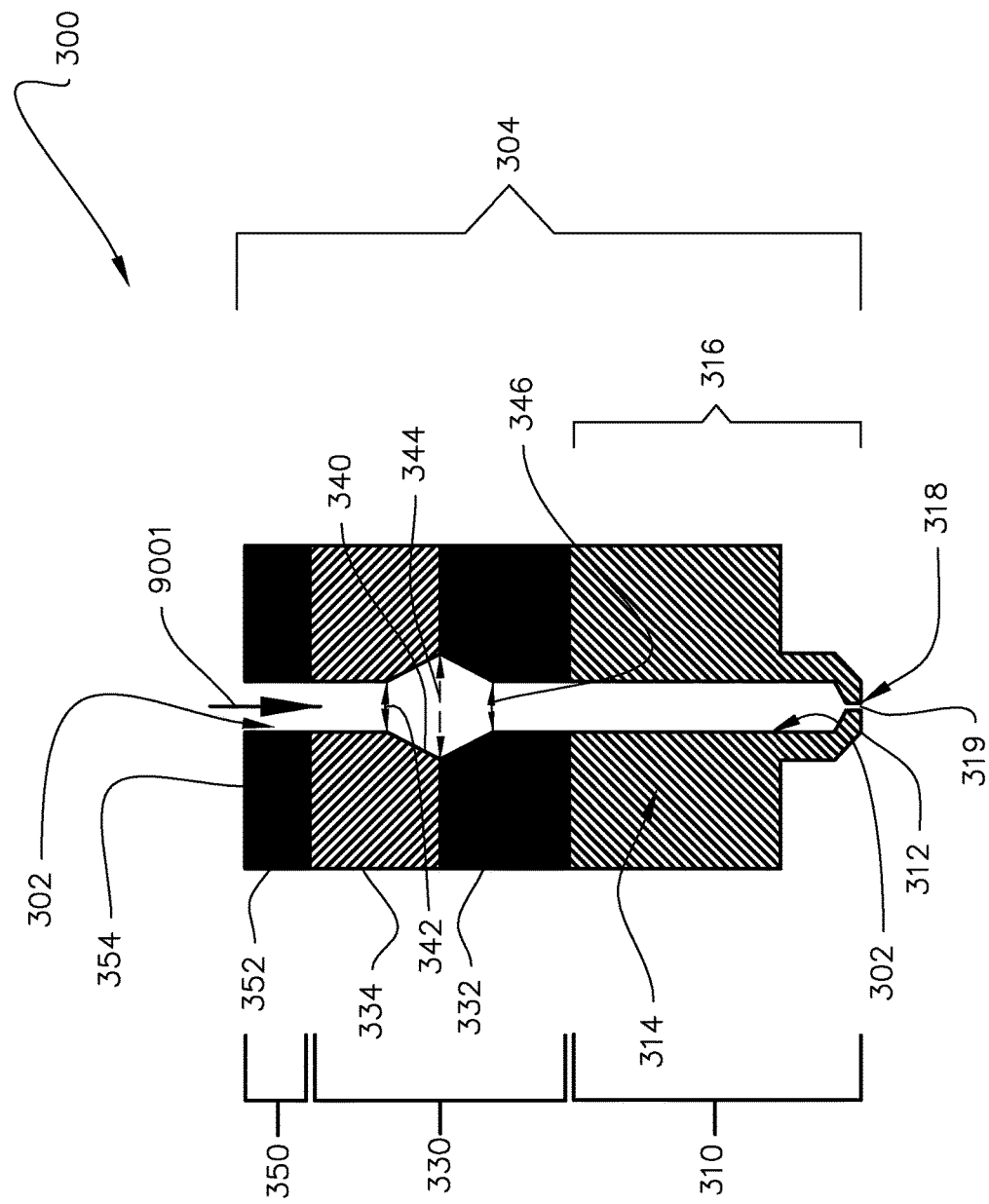
FIG. 3 may depict a cross-sectional schematic view of an embodiment of an extrusion core from a printer for three dimensional printing.

FIG. 3 may depict a cross-sectional schematic view of an embodiment of an extrusion core 300 from an embodiment of printer 100. In some embodiments, printer 100 may comprise one or more extrusion cores 300. A given extrusion core 300 is what liquefies filament 9001 into liquid extrudate. And it is the liquid extrudate that cools and hardens to a given desirable shape of a 3D printed object. Note, in FIG. 3 filament 9001 is depicted schematically as a downward moving arrow. See also FIG. 4B for filament 9001 in is solid filament state.

In some embodiments, filament 9001 may be thermoplastic that may be substantially solid at room temperatures. In some embodiments, filament 9001 may be one or more of: a thermoplastic, a wax, a clay, a metal wire, and/or the like. In some embodiments, filament 9001 at room temperatures may be flexible and/or semi-rigid. In some embodiments, prior to filament 9001 being liquefied via a given extrusion core 300, filament 9001 may be stored in a coiled format, wherein such a coil may be stored on filament-spool 114.

In some embodiments, a given extrusion core 300 may be a component of a central-carriage 632 (which e.g., may be an x-axis carriage). See e.g., a FIG. 6 series of figures for central-carriage 632.

Turning back to FIG. 3, in some embodiments, a given extrusion core 300 may comprise a filament-pathway 304. In some embodiments, filament-pathway 304 may be a pathway through the given extrusion core 300 that portions of filament 9001 move through. In some embodiments, filament-pathway 304 may removably receive portions of filament 9001. In some embodiments, filament-pathway 304 may be described as an elongate-volume 302. In some embodiments, elongate-volume 302 is longer in terms of its longitudinal length as compared to its transverse width. In some embodiments, elongate-volume 302 may be a substantially bound channel through extrusion core 300. In some embodiments, an inside diameter of elongate-volume 302 may be sized to receive an outside diameter of filament 9001. In some embodiments, elongate-volume 302 may define and may substantially bound filament-pathway 304 along the length of filament-pathway 304 in extrusion core 300. In some embodiments, filament 9001 may move through filament-pathway 304 of extrusion core 300 in a direction of flow from one-end 354 to distal-end 312 of extrusion core 300. In some embodiments, filament-pathway 304 may begin at one-end 354 and end at distal-end 312. In some embodiments, elongate-volume 302 may begin at one-end 354 and end at distal-end 312. In some embodiments, filament 9001 may enters filament-pathway 304 at one-end 354 as a solid and may then leave filament-pathway 304 at distal-end 312 as a liquid, i.e., as liquid extrudate.

Continuing discussing FIG. 3, in some embodiments, extrusion core 300 may be divided intro three different temperature zones: cool-end 350, transition-section 330, and hot-end 310. In some embodiments, elongate-volume 302 may have these three different temperature zones: cool-end 350, transition-section 330, and hot-end 310. In some embodiments, filament-pathway 302 may pass through these three different temperature zones: cool-end 350, transition-section 330, and hot-end 310. The separation of temperature into three distinct zones allows for precise control of filament 9001 material properties.

Continuing discussing FIG. 3, in some embodiments, hot-end 310 may comprise first-temperature-controlled-block 314.

In some embodiments, hot-end 310 generates a maximum temperature to liquefy filament 9001. Such liquefied filament 9001 may have a sufficiently low viscosity to allow for efficient extrusion through nozzle 318. In some embodiments, first-temperature-controlled-block 314 may be set at a melt temperature for a given filament 9001. In some embodiments, first-temperature-controlled-block 314 may be a resistive type heating block. In some embodiments, first-temperature-controlled-block 314, aside from resistor elements, may be substantially constructed from a material conducive for heat transfer. For example, and without limiting the scope of the present invention, first-temperature-controlled-block 314, aside from resistor elements, may be substantially constructed from aluminum. In some embodiments, first-temperature-controlled-block 314 may comprise one or more sensors; such as, but not limited to, temperature sensors. In some embodiments, hot-end 310 may begin at distal-end 312. In some embodiments, hot-end 310 may end where first-temperature-controlled-block 314 meets first-insulator 332. In some embodiments, a portion of elongate-volume 302 may be located within first-temperature-controlled-block 314. In some embodiments, a portion of filament-pathway 304 may be located within first-temperature-controlled-block 314. In some embodiments, this portion of elongate-volume 302 within first-temperature-controlled-block 314 may be a melt-chamber 316. In some embodiments, this portion of filament-pathway 304 within first-temperature-controlled-block 314 may be melt-chamber 316. In some embodiments, when printer 100 may be actively extruding extrudate from a given extrusion core 300, filament 9001 within melt-chamber 316 may be substantially liquid. In some embodiments, liquid extrudate of filament 9001 may emerge from distal-end 312. In some embodiments, melt-chamber 316 may be a portion of elongate-volume 302 within first-temperature-controlled-block 314. In some embodiments, melt-chamber 316 may be a portion of filament-pathway 304 within first-temperature-controlled-block 314. See e.g., FIG. 3.

Continuing discussing FIG. 3, in some embodiments, transition-section 330 may comprise first-insulator 332 and second-temperature-controlled-block 334. In some embodiments, transition-section 330 may begin where hot-end 310 ends at an interface between first-temperature-controlled-block 314 and first-insulator 332. In some embodiments, transition-section 330 may end where second-temperature-controlled-block 334 ends at an interface between second-temperature-controlled-block 334 and first-insulator 352. In some embodiments, transition-section 330 may be disposed between one-end 354 and distal-end 312. In some embodiments, transition-section 330 may be disposed between first-temperature-controlled-block 314 and first-insulator 352. In some embodiments, first-insulator 332 may in communication with first-temperature-controlled-block 314 and wherein the first-insulator 332 may also in communication with second-temperature-controlled-block 334. In some embodiments, first-insulator 332 may be substantially constructed from a heat insulating material, i.e., a material that conducts heat poorly. For example, and without limiting the scope of the present invention, in some embodiments, first-insulator 332 may be substantially constructed from TEFLON or a TEFLON like material. In some embodiments, second-temperature-controlled-block 334 may be a resistive type heating block. In some embodiments, second-temperature-controlled-block 334, aside from resistor elements, may be substantially constructed from a material conducive for heat transfer. For example, and without limiting the scope of the present invention, second-temperature-controlled-block 334, aside from resistor elements, may be substantially constructed from aluminum. In some embodiments, second-temperature-controlled-block 334 may comprise one or more sensors; such as, but not limited to, temperature sensors. In some embodiments, together first-insulator and second-temperature-controlled-block 334 may surround a different portion of elongate-volume 302. In some embodiments, together first-insulator and second-temperature-controlled-block 334 may surround a different portion of filament-pathway 304. In some embodiments, transition-section 330 may prevent or minimize jamming of hardened filament 9001 in elongate-volume 302 by increasing a viscosity of liquid to semi-liquid filament 9001 (in transition-section 330) to create a beneficial seal out of filament 9001 material itself. In some embodiments, transition-section 330 may maintain a temperature, via second-temperature-controlled-block 334, such that the viscosity of liquid to semi-liquid filament 9001 is high. Filament 9001 jamming minimization within elongate-volume 302 is also discussed further below in the discussion of diverging-converging-chamber 340. See e.g., FIG. 3.

Continuing discussing FIG. 3, in some embodiments, cool-end 350 may comprise second-insulator 352. In some embodiments, second-insulator 352 may be substantially constructed from a heat insulating material, i.e., a material that conducts heat poorly. For example, and without limiting the scope of the present invention, in some embodiments, second-insulator 352 may be substantially constructed from TEFLON or a TEFLON like material. In some embodiments, cool-end 350 may begin where transition-section 330 ends and cool-end 350 may then end at one-end 354. For example, and without limiting the scope of present invention, temperatures at one-end 354 may be substantially environmental room temperatures. In some embodiments, second-insulator 352 may reduce temperatures to a safe level for operators. In some embodiments, second-insulator 352 may surround yet another different portion of elongate-volume 302. In some embodiments, second-insulator 352 may surround yet another different portion of filament-pathway 304. See e.g., FIG. 3.

Continuing discussing FIG. 3, in some embodiments, hot-end 310 may comprise first-temperature-controlled-block 314 and nozzle 318. In some embodiments, nozzle 318 may be located at distal-end 312. In some embodiments, nozzle 318 may be integral with first-temperature-controlled-block 314. This may prevent leakage in hot-end 310 between a nozzle region and a heating region. Furthermore, having such a nozzle integral with such a heating region maintains filament 9001 temperature at its melting temperature where the liquid extrudate emerges from such a nozzle. In some embodiments, nozzle 318 may comprise an orifice-opening 319. In some embodiments, nozzle 318 may comprise an orifice-opening 319 at distal-end 312. In some embodiments, orifice-opening 319 may a region of nozzle 318 where liquid extrudate emerges from nozzle 318. In some embodiments, orifice-opening 319 is of a predetermined size. In some embodiments, a cross-section of the orifice-opening 319 may be a two-dimensional shape selected from the following shapes: a circle, an oval, an ellipse, a half-circle, a half-oval, a half-ellipse, a star, a polygon, a regular polygon, an irregular polygon, and/or the like.

In some embodiments, different nozzles 318 each with a specific different sized orifice-opening 319 may be used. For example, and without limiting the scope of the present invention, larger sized orifice-opening 319 may be used for filler work; whereas, smaller sized orifice-openings 319 may be used for detail layering.

In some embodiments, melt-chamber 316 may be an elongated-melt-chamber. In some embodiments, utilization of the elongated melt chamber may provide sufficient time period for filament 9001 to melt before being extruded as the liquid extrudate. For high filament velocities, the prior art shorter melt chambers did not have adequate length to ensure that the filament was fully melted before passing through their nozzle, thereby limiting the velocity at which the filament may be fed; thus limiting the overall speed at which a layer of a 3D printed object may be produced. In one embodiment of the present invention, melt-chamber 316 may have a longitudinal length of at least one inch. In some embodiments, the elongated-melt-chamber may be longer as compared to a length of transition-section 330. In some embodiments, the elongated-melt-chamber may be longer as compared to a length of cool-end 350.

Continuing discussing FIG. 3, in some embodiments, within transition-section 330 may be diverging-converging-chamber 340. That is, in some embodiments, a portion of elongate-volume 302 within transition-section 330 may be diverging-converging-chamber 340. Or alternatively, in some embodiments, a portion of filament-pathway 304 within transition-section 330 may be diverging-converging-chamber 340. Unique geometry in combination with thermal controls in transition-section 330 may prevent or minimize filament 9001 jamming within extrusion core 300. Diverging-converging-chamber 340 may minimize interruptions in the direction of flow of filament 9001 along filament-pathway 304. With respect to the direction of flow of filament 9001 through filament-pathway 304 from one-end 354 towards distal-end 312, diverging-converging-chamber 340 may begin within second-temperature-controlled-block 334 and diverging-converging-chamber 340 may end within first-insulator 332. In some embodiments, a cross-section of diverging-converging-chamber 340 begins with a first-cross-section-size 342. First-cross-section-size 342 may be within second-temperature-controlled-block 334. In some embodiments, this cross-section of diverging-converging-chamber 340 from first-cross-section-size 342 then progresses by increasing in size until a maximum-cross-section 344 is reached. In some embodiments, this maximum-cross-section 344 may be located at the interface between second-temperature-controlled-block 334 and first-insulator 332. In some embodiments, this cross-section of diverging-converging-chamber 340 from maximum-cross-section 344 then progresses by decreasing in size until diverging-converging-chamber 340 terminates at a second-cross-section-size 346. In some embodiments, second-cross-section-size 346 may be located within first-insulator 332. These cross-sections (first-cross-section-size 342, maximum-cross-section 344, and second-cross-section-size 346) may be substantially perpendicular to a longitude of filament-pathway 304. In some embodiments, first-cross-section-size 342 and second-cross-section-size 346 may be substantially a same size. In some embodiments, maximum-cross-section 344 may be wider than either of first-cross-section-size 342 or second-cross-section-size 346. See e.g., FIG. 3.

As filament 9001 moves into melt-chamber 316 of hot-end 310, filament 9001 is liquefied, and pressurized. To ensure that the pressurized and liquefied filament 9001 flows out of the nozzle 318 only, a seal must be formed at the entrance to hot-end 310 otherwise, liquid filament 9001 may shoot upwards, cooling and hardening along the way, thereby jamming any further filament 9001 from feeding into hot-end 310. Transition-section 330 prevents or minimizes such jamming by utilizing the viscosity of filament 9001 material to create a beneficial seal. Transition-section 330 maintains a temperature such that the viscosity of the liquid filament 9001 is high, allowing for pressure gradients to exist in the liquid filament from hot-end 310 to diverging-converging-chamber 340 of transition-section 330. Hot-end 310 is beneficially sealed by pressure gradients that is maintained by the high viscosity of the liquid filament 9001 in transition-section 330.

The bottom of diverging-converging-chamber 340 (e.g., at or near second-cross-section-size 346) of transition-section 330 reduces the flow velocity of the liquid filament 9001 as the liquid filament 9001 flows upward against the intended direction of flow. To aid in reduction of temperature, the bottom taper of diverging-converging-chamber 340 (e.g., at or near second-cross-section-size 346) is within first-insulator 332. Whereas, the top of diverging-converging-chamber 340 (e.g., at or near first-cross-section-size 342) allows extra length and the diverging shape with respect to the intended direction of filament 9001 flow (or a converging shape with respect to unintended upward moving filament 9001) reduces unwanted upward movement of filament 9001. In some embodiments, the top of diverging-converging-chamber 340 may not be a requirement, however, it allows for enhanced reliability in the event that the liquid filament 9001 reaches that far up. In that case, the liquid filament 9001 will harden into the taper shape, thus allowing it to move downward into the hotter zone and melt again, preventing a jam. That is in use, diverging-converging-chamber 340 may comprise micro-eddies and convection currents of filament 9001 in different states of viscosity and density according to temperatures controlled by transition-section 330 and hot-end 310 and due to the geometry of diverging-converging-chamber 340. In this manner, the liquid filament 9001 is effectively and beneficially sealed and does not block filament-pathway 304; and filament 9001 is fully liquid before exiting through hot-end 310 nozzle 318. That is in use, the beneficial seal that is formed, may be formed from filament 9001 material itself and this beneficial seal may exist annularly around filament 9001 within diverging-converging-chamber 340, such that a center of elongate-volume 302 along its longitude remains unclogged. Note, the synergistic combination use of diverging-converging-chamber 340 and the various temperature controlled zones, working together to form this beneficial seal of filament 9001 material, may be superior over attempting to use a mechanical seal because, at operational temperatures choice of materials for such a mechanical seal are limited; and as choice of material changes for a given filament 9001, the fluid dynamics properties also change, which may make a given mechanical seal that may function for one type of material non-functional for anther choice of filament 9001 material. Note, a top direction is towards to one-end 354 and a bottom is towards distal-end 312.

In some embodiments, pressurizing elongate-volume 302 and/or filament-pathway 304, may also minimize liquefied filament 9001 from migrating against the intended direction of flow, which as noted may be undesirable. Some such pressurization may be supplied by filament-feeding-system 400. Some such pressurization may also be generated from the process of melting and liquefying filament 9001 in melt-chamber 316. In some embodiments, additional pressure may be supplied via a pump in communication with elongate-volume 302 and/or with filament-pathway 304. For example, and without limiting the scope of the present invention, in some embodiments, elongate-volume 302 and/or filament-pathway 304 may be pressurized to at least 60 psi.

In some embodiments, interior surfaces of elongate-volume 302 may be substantially smooth. In some embodiments, interior surfaces of filament-pathway 304 may be substantially smooth. This may help to minimize jams of filament 9001 within extrusion core 300. In some embodiments, these interior surfaces may be free from burs and hard angles. In some embodiments, these interior surfaces may provide for a consistently smooth surface even across transitions from one material to another within filament-pathway 304. For example, and without limiting the scope of the present invention, filament 9001 may first pass through an insulating material of second-insulator 352, such as, but not limited to TEFLON or a TEFLON like material; then filament 9001 may pass through a thermally conductive material of second-temperature-controlled-block 334, such as, but not limited to, aluminum; then filament 9001 may pass through another insulating material of first-insulator 332, such as, but not limited to TEFLON or a TEFLON like material; and then filament 9001 may pass through another thermally conductive material of first-temperature-controlled-block 314, such as, but not limited to aluminum; wherein filament-pathway 304 through these different materials may be a smooth pathway.

Alternatively, in some embodiments, a given printer 100 may comprise one or more extrusion cores 300. In some embodiments, each such extrusion core 300 may comprise structures surrounding filament-pathway 304. In some embodiments, filament-pathway 304 may removably receive filament 9001 (or portions thereof). In some embodiments, filament 9001 may enter filament-pathway 304 at one-end 354 as a solid and may leave filament-pathway 304 at a distal-end 312 as a liquid. In some embodiments, filament-pathway 304 may comprise diverging-convergingchamber 340. In some embodiments, with respect to the direction of flow of filament 9001 through filament-pathway 304 from one-end 354 towards distal-end 312, diverging-converging-chamber 340 begins at first-cross-section-size 342 of diverging-converging-chamber 340; wherein a cross-section of diverging-converging-chamber 340 then progresses by increasing in size until maximum-cross-section 344 is reached; wherein the cross-section then decreases in size until terminating at second-cross-section-size 346. In some embodiments, these cross-sections (first-cross-section-size 342, maximum-cross-section 344, and second-cross-section-size 346) may be substantially perpendicular to the longitude of filament-pathway 304. In some embodiments, these structures surrounding filament-pathway 304 may comprise one or more of: first-temperature-controlled-block 314, first-insulator 332, second-temperature-controlled-block 334, and/or second-insulator 352. In some embodiments, these structures surrounding filament-pathway 304 may comprise at least first-temperature-controlled-block 314; in which case, first-temperature-controlled-block 314 may surround substantially all of filament-pathway 304.

Figure 4A:
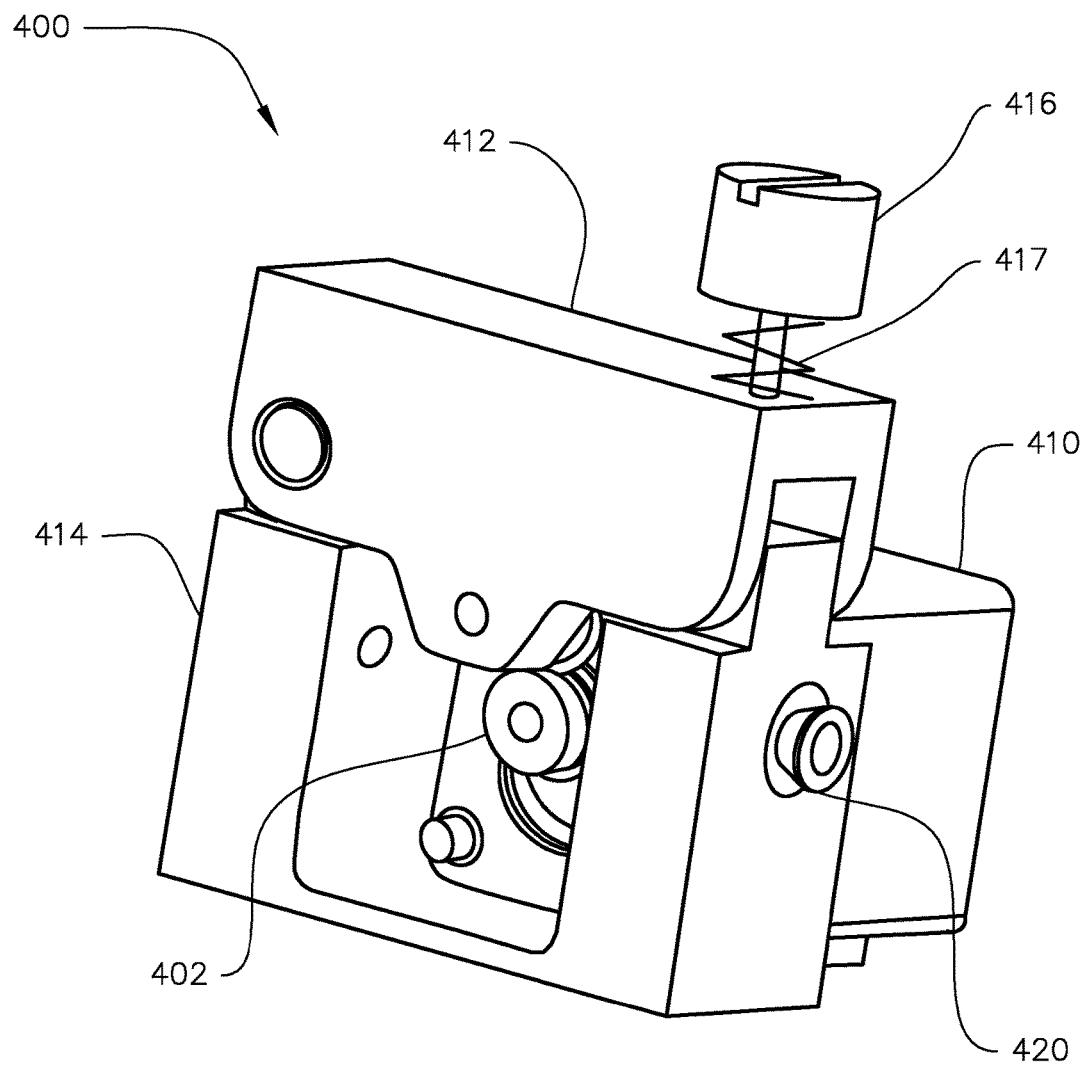
FIG. 4A may depict an embodiment of a filament-feeding-system from a printer for three dimensional printing, shown from a perspective view, with a lid removably closed to a base of the filament-feeding-system.
Figure 4B:
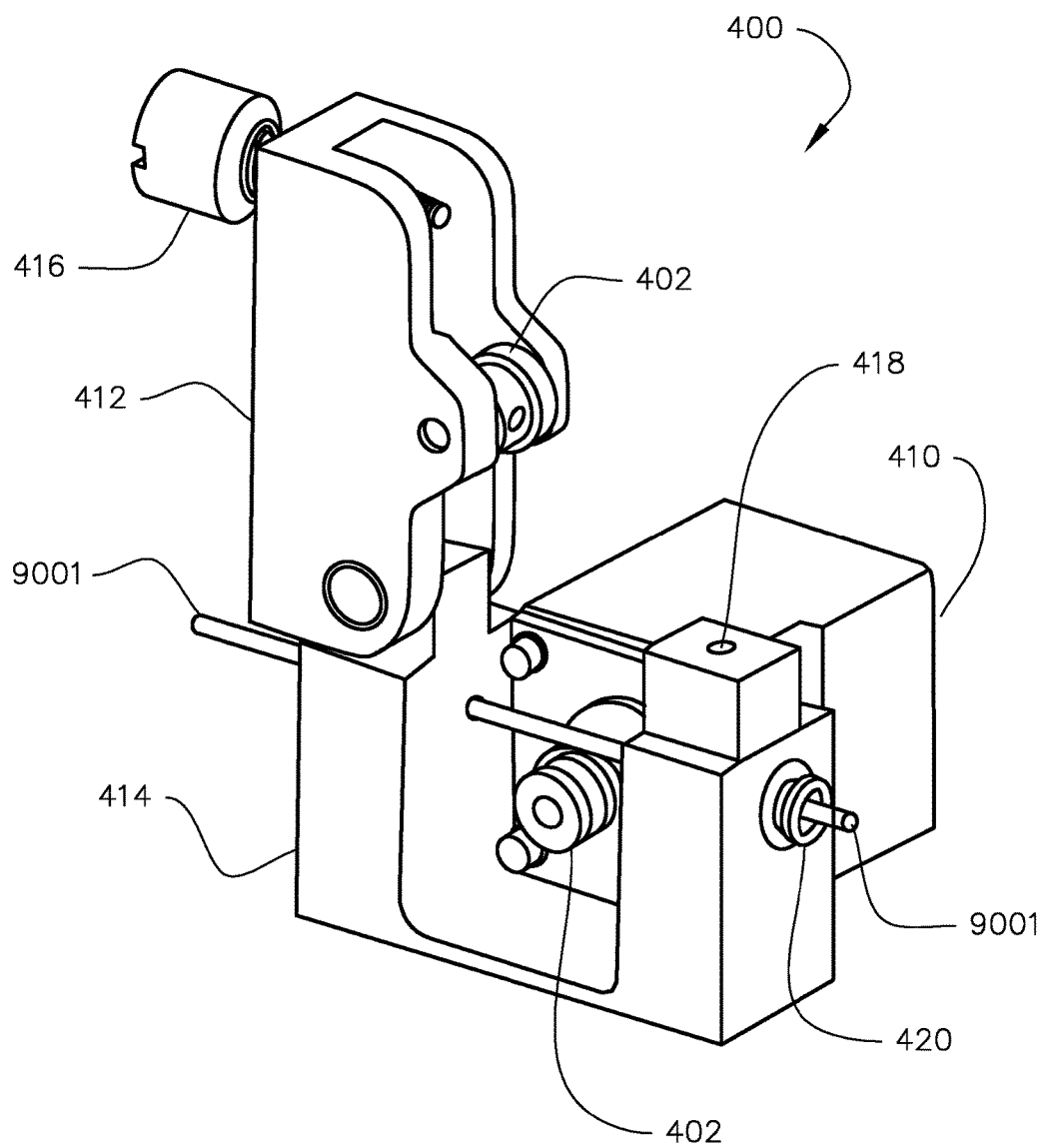
FIG. 4B may depict the filament-feeding-system of FIG. 4A, but in a configuration where the lid is up, also shown from a perspective view.
Figure 4C:
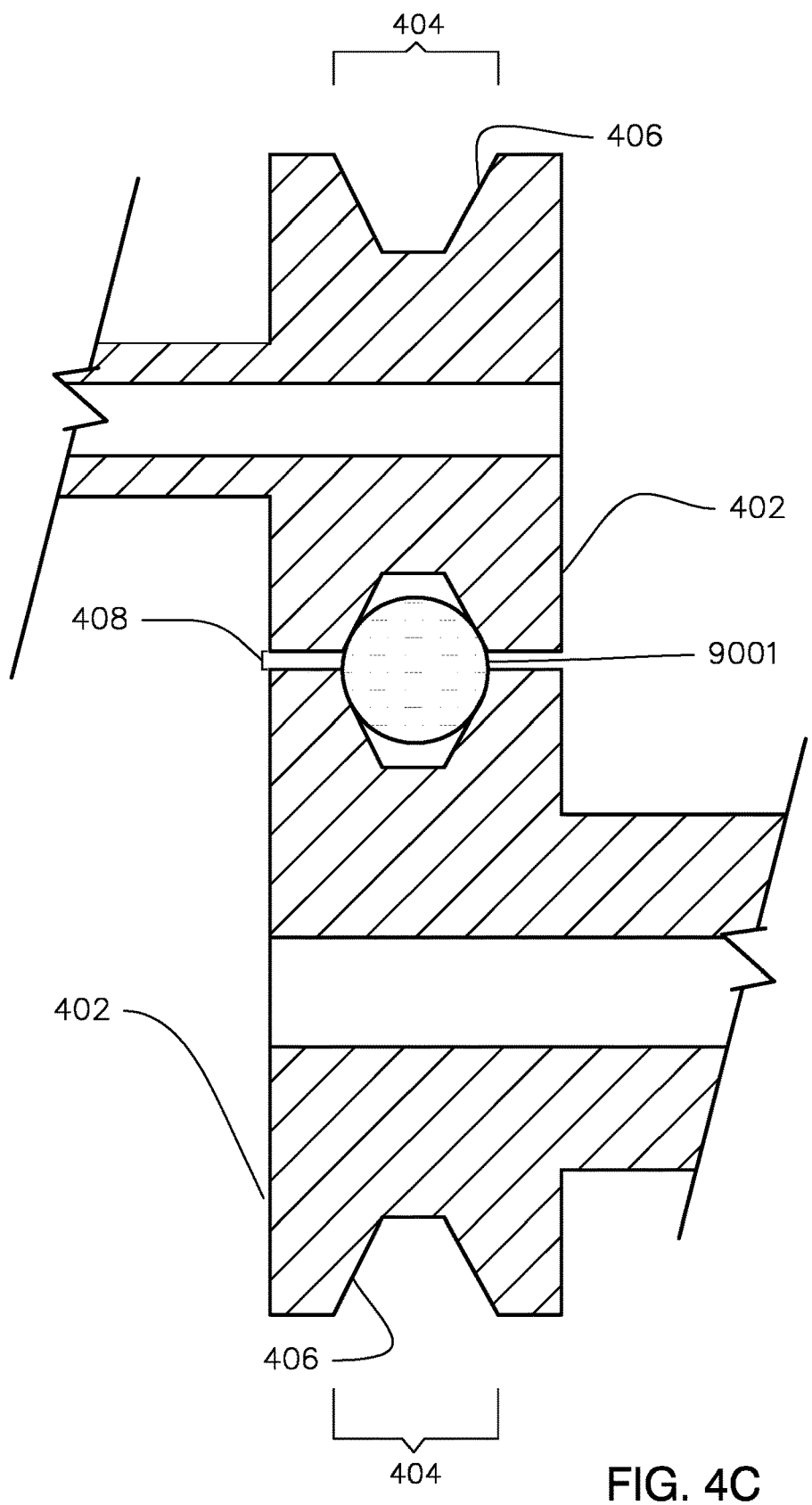
FIG. 4C may depict a cross-sectional view of a pair of opposing smooth-faced-rollers.

A FIG. 4 series of figures may comprise FIG. 4A through and including FIG. 4C. These FIG. 4 series of figures may depict filament-feeding-system 400 of printer 100. FIG. 4A may depict an embodiment of a filament-feeding-system 400, shown from a perspective view, with a lid 412 removably closed to a base 414 of filament-feeding-system 400. FIG. 4A may be an active operational configuration for filament-feeding-system 400 to feed filament 9001 to a given extrusion core 300. FIG. 4B may depict filament-feeding-system 400, but in a configuration where lid 412 is up, also shown from a perspective view. FIG. 4C may depict a cross-sectional view of a pair of opposing smooth-faced-rollers 402 of filament-feeding-system 400.

In some embodiments, filament-feeding-system 400 may comprise a pair of smooth-faced-rollers 402. Yet another solution for improved reliability involves use of smooth-faced-rollers 402 having no grooves, teeth, ribs, or knurling of which to grip filament 9001 during feeding of filament 9001 to a given extrusion core 300. Smooth-faced-rollers 402 use frictional force to grip and move filament 9001, at a given velocity into the given extrusion core 300. Whereas, prior art feed mechanisms utilized grooves, teeth, ribs, or knurling to grip the soft filament which results in deformation of the filament and/or breakage of the filament into shards and irregular pieces that build up and potentially block the filament path and other moving parts of a 3D printer. Regular cleaning of the filament path is necessary to prevent jams in such prior art 3D Printers. In one embodiment, filament-feeding-system 400 may be moved between an open position (FIG. 4B) to access smooth-faced-rollers 402 and closed position (FIG. 4A).

In some embodiments, each smooth-faced-roller 402 may be a cylindrical-disk. Each smooth-faced-roller 402 may rotate (i.e., spin) along its rotational axis. In some embodiments, around a circumference of the cylindrical-disk is a grove 404 with smooth surfaces 406. In some embodiments, groove 404 may be sized to receive half or less of a transverse width cross-section of filament 9001. See e.g., FIG. 4C. In some embodiments, in the operational configuration of FIG. 4A, each rotational axis of each pair of smooth-faced-roller 402 may be substantially parallel.

In some embodiments, when filament-feeding-system 400 may be in the closed-configuration (FIG. 4A) the two grooves 404 may a predetermined-distance 408 from each other that causes a portion of filament 9001 passing simultaneously through portions of each groove 504 to be frictionally gripped by the two paired grooves 404. See e.g., FIG. 4C.

In some embodiments, at least one of the pair of smooth-faced-rollers 402 is in communication with a rotational-motive-means 410 that causes the at least one of the pair of smooth-faced-rollers 402 to rotate. For example, and without limiting the scope of the present invention, rotational-motive-means 410 may be a motor. In some embodiments, when filament-feeding-system 400 may be in the closed-configuration and rotational-motive-means 410 is causing the at least one of the pair of smooth-faced-rollers 402 to rotate, the two paired grooves 404 frictionally grip and move filament 9001 along toward the given extrusion core 300.

In some embodiments, when the filament-feeding-system 400 may be in the open-configuration (FIG. 4B) the two grooves 404 may be at a distance from each other that is greater than predetermined-distance 408 of the closed-configuration.

In some embodiments, filament-feeding-system 400 may comprise lid 412 and base 414. In some embodiments, lid 412 may be pivotally attached to base 414 (e.g., via a hinge).; In some embodiments, one of the pair of smooth-faced-rollers 402 is in communication with base 414; and a remaining one of the pair of smooth-faced-rollers 402 is attached to lid 412 in a manner that permits free rotation of that smooth-faced-roller 402. In some embodiments, rotational-motive-means 410 may also be attached to base 414, such that rotational-motive-means 410 powers smooth-faced-roller 402 that is attached to base 414. See e.g., FIG. 4A and FIG. 4B.

In some embodiments, rotational-motive-means 410 may also be attached to lid 412, such that rotational-motive-means 410 powers smooth-faced-roller 402 that is attached to lid 412. This embodiment is not depicted in the figures.

In some embodiments, lid 412 may comprise a fastener 416 that may removably connect lid 412 to base 414. In some embodiments, when fastener 416 may be removably connected to base 414, the filament-feeding-system 400 may be in the closed-configuration. In some embodiments, fastener 416 may be received into a fastener-receiver 418. In some embodiments, fastener-receiver may be located in base 414. See e.g., FIG. 4A and FIG. 4B. For example, and without limiting the scope of the present invention, fastener 416 may be a threaded bolt and fastener-receiver 418 may be a complimentary female threaded hole. Securing of lid 412 to base 414 may be what generates the frictional forces between the paired smooth-faced-rollers 402. In some embodiments, fastener 416 may further comprise a resistance means 417. Resistance means 417 may provide the frictional forces between the paired smooth-faced-rollers 402 when lid 412 may be removably secured to base 414. For example, and without limiting the scope of the present invention, resistance means 417 may be a spring.

In some embodiments, filament 9001 may exit filament-feeding-system 400 via exit-port 420. In some embodiments, exit-port may be a through hole attached to a portion of base 414. See e.g., FIG. 4A and FIG. 4B.

Note, in some embodiments, filament-feeding-system 400 may comprise filament-spool 114. Note, in some embodiments, portion of the filament feeding system, e.g., filament-spool 114 and/or filament-feeding-system 400 may be substantially enclosed to minimize buildup of contaminants (e.g., dust) upon filament 9001 and various mechanical and/or moving parts of printer 100.

Figure 5A:
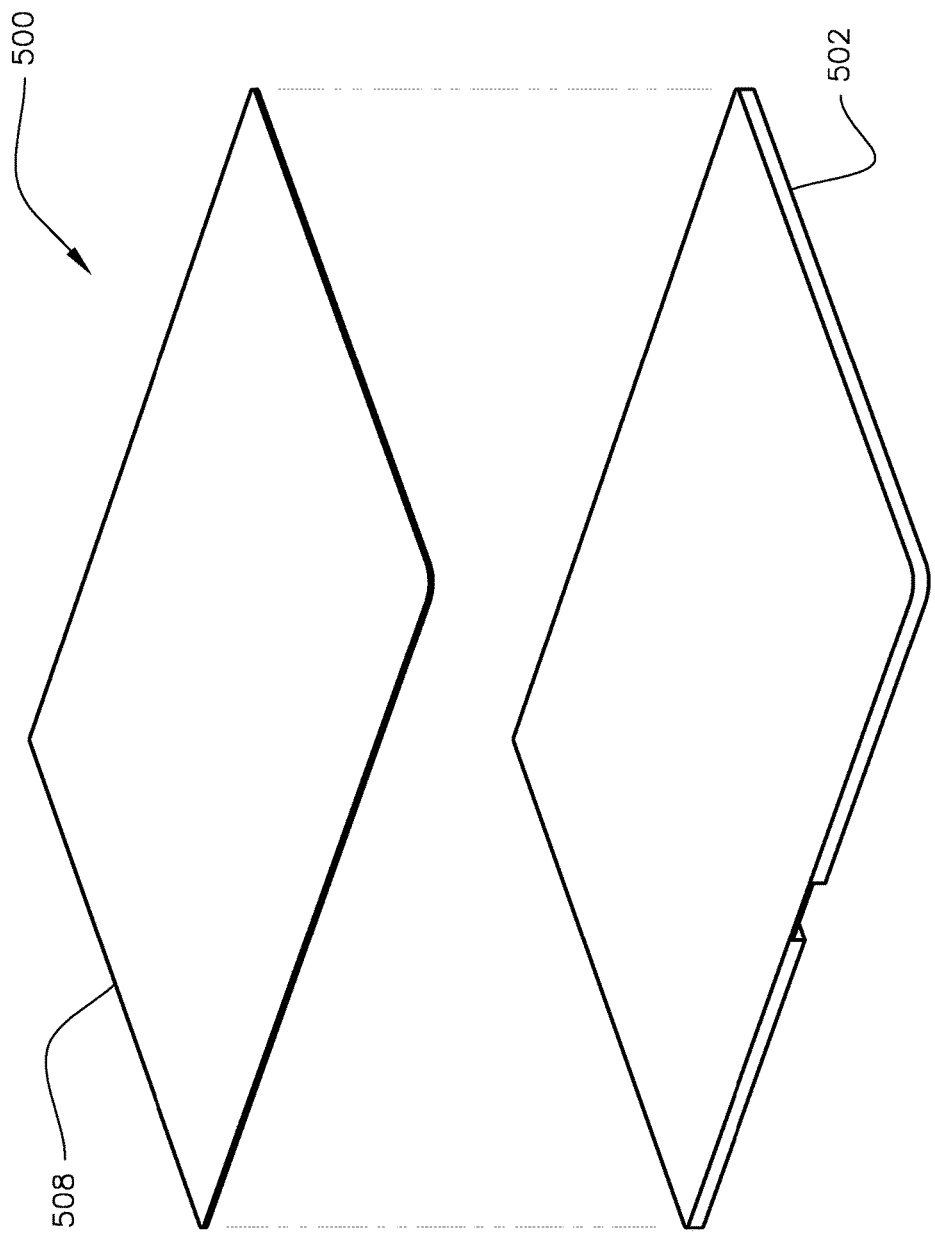
FIG. 5A may depict an embodiment of a build plate shown with an adhesion-layer of the build plate exploded for illustrative purposes, shown from a perspective view.
Figure 5B:
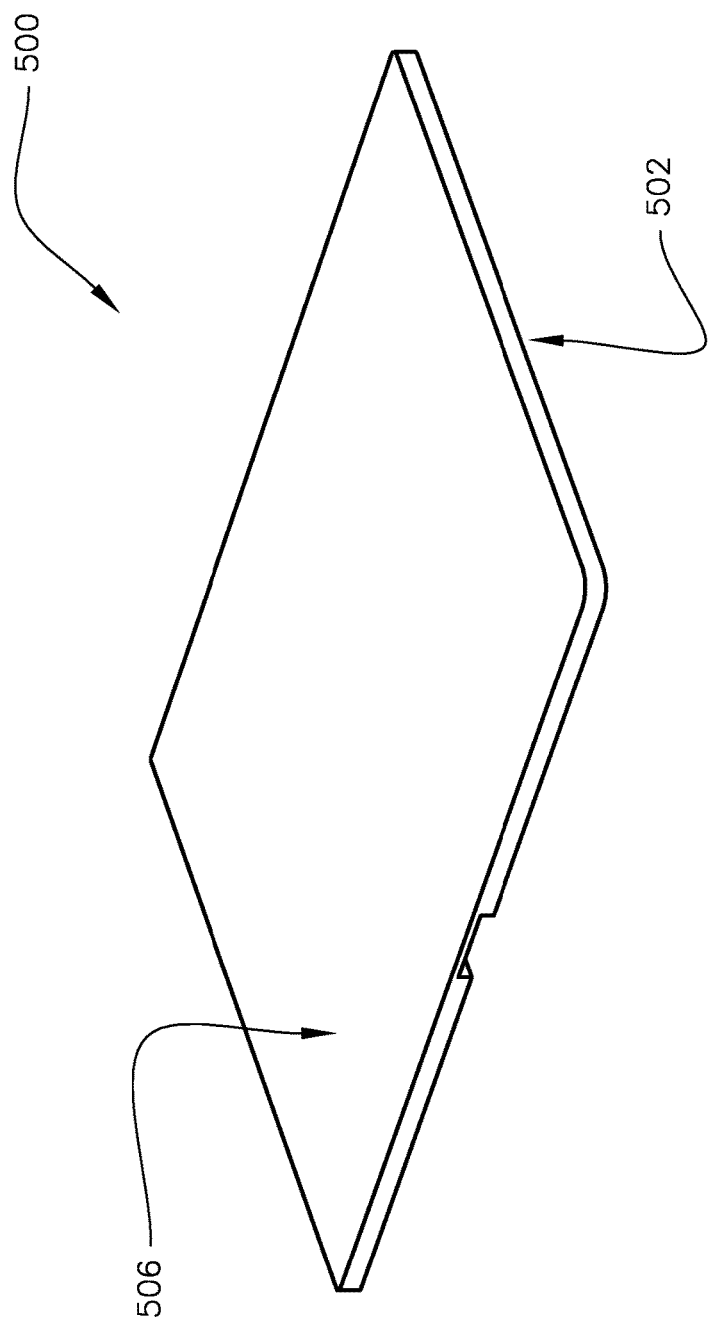
FIG. 5B may depict an embodiment of a build plate subassembly, shown from a perspective view.

A FIG. 5 series of figures may comprise FIG. 5A through and including FIG. 5D. These FIG. 5 series of figures may depict a build plate subassembly 500 of printer 100. FIG. 5A may depict a build plate 502 shown with an adhesion-layer 508 of build plate 502 exploded for illustrative purposes, shown from a perspective view. FIG. 5B may depict build plate subassembly 500, shown from a perspective view. FIG. 5C may depict build plate subassembly 500 with build plate 502 and with adhesion-layer 508, shown from a perspective view. Also in FIG. 5C sectional-line 5D-5D is shown. FIG. 5D may depict a cross-sectional view of build plate subassembly 500 of FIG. 5C; wherein the cross-section is along sectional-line 5D-5D that is shown in FIG. 5C.

In some embodiments, build plate subassembly may comprise build plate 502. In some embodiments, build plate 502 may be a structural member. In some embodiments, build plate 502 may be fabricated from a structural material. In some embodiments, build plate 502 may be substantially rigid. In some embodiments, build plate 502 may comprise a top surface 506. See e.g., FIG. 5B. In some embodiments, top surface 506 may an intended work surface, intended to removably received extrudate filament 9001 extruded from nozzle 318 of a given extrusion core 300. That is, in some embodiments, top surface 506 may be where layer upon layer of extrudate filament 9001 are removably received as a given 3D printed object is built by 3D printing. In some embodiments, top surface 506 of build plate 502 may be substantially flat. In some embodiments, a maximum permitted variance in flatness of top surface 506 may be a height of a given layer of filament 9001 extrudate.

In some embodiments, build plate subassembly 500 may comprise build plate 502 and adhesion-layer 508. Alternatively, in some embodiments, build plate 502 may comprise adhesion-layer 508. In some embodiments, adhesion-layer 508 may be in communication with the at least the portion of build plate 502 such that a top portion of adhesion-layer 508 is top surface 506 of build plate 502. In some embodiments, adhesion-layer 508 may not be a structural member. Instead, build plate 502 may provide requisite rigidity, support, and/or flatness for adhesion-layer 508. In some embodiments, adhesion-layer 508 may be a coating applied to at least some top portions of build plate 502. See e.g., FIG. 5A, FIG. 5C, and FIG. 5D.

In some embodiments, adhesion-layer 508 may be substantially constructed from a material of construction determinable from a material of filament 9001 extrudate such that filament 9001 extrudate can wet the material of construction of adhesion-layer 508, so as to facilitate retention of filament 9001 extrudate upon top surface 506 without filament 9001 extrudate slippage with respect to top surface 506.

In some embodiments, adhesion-layer 508 may be substantially constructed from a thermo-plastic. In some embodiments, adhesion-layer 508 may be substantially constructed from a synthetic fluoropolymer of tetrafluoroehtylene; i.e., a TEFLON or a TEFLON like material. In some embodiments, adhesion-layer 508 may be substantially constructed from a polytetrafluorethylene; i.e., PTFE, such as a TEFLON or a TEFLON like material.

In some embodiments, choice of material of construction of adhesion-layer 508 may also facilitate removal of hardened extrudate (i.e., the formed 3D printed object) from adhesion-layer 508, once 3D printing is complete.

In some embodiments, the structural member of build plate 502 may be substantially constructed from a rigid material. In some embodiments, the structural member of build plate 502 may be substantially constructed from a metal. For example, and without limiting the scope of the present invention, in some embodiments, the structural member of build plate 502 may be substantially constructed from an aluminum. In some embodiments, the structural member of build plate 502 may be substantially constructed from a thermoplastic; which may comprise fillers (e.g., glass) and/or particular geometry for reinforcing rigidity (e.g., ribbing).

In some embodiments, a top portion of at least a portion of the structural member of build plate 502 may be processed to a predetermined flatness. In some embodiments, this processing may be done by a surface grinder. In some embodiments, this top portion may be top surface 506.

In some embodiments, this top portion of the at least a portion of the structural member of build plate 502 may be sand blasted to form a suitable substrate for adhesion with adhesion-layer 508, which may be applied to this top portion.

In some embodiments, build plate subassembly 500 may comprise build plate 502 and bed 504. In some embodiments, build plate subassembly 500 may comprise build plate 502, bed 504, and adhesion-layer 508. Bed 504 may be shown in a FIG. 7 series of figures. In some embodiments, bed 504 may be a structural member. In some embodiments, bed 504 may support build plate 502. In some embodiments, bed 504 may be an anchor for build plate 502. In some embodiments, build plate 502 may be removable from bed 504. In some embodiments, bed 504 may comprise mono-rail-sleeve 704, which may receive mono-rail 702.

In some embodiments, build plate subassembly 500 may comprise one or more bed heaters to transmit heat to top surface 506. Such bed heaters may be block heaters. In some embodiments, such bed heaters may be in communication with bed 504. In some embodiments, such bed heaters may be in communication with build plate 502. Such heaters may transmit appropriate heat through build plate 502 (which may be thermally conductive material) and through adhesion-layer 508 (which may be a thermally insulating material). Such bed heaters may help control timing of filament 9001 extrudate cooldown. Such bed heaters may help with removal of completed 3D printed object from top surface 506. And such bed heaters may help to provide an even temperature across top surface 506; which may be important in controlling cool down and shrinkage of the 3D printed object.

Figure 6A:
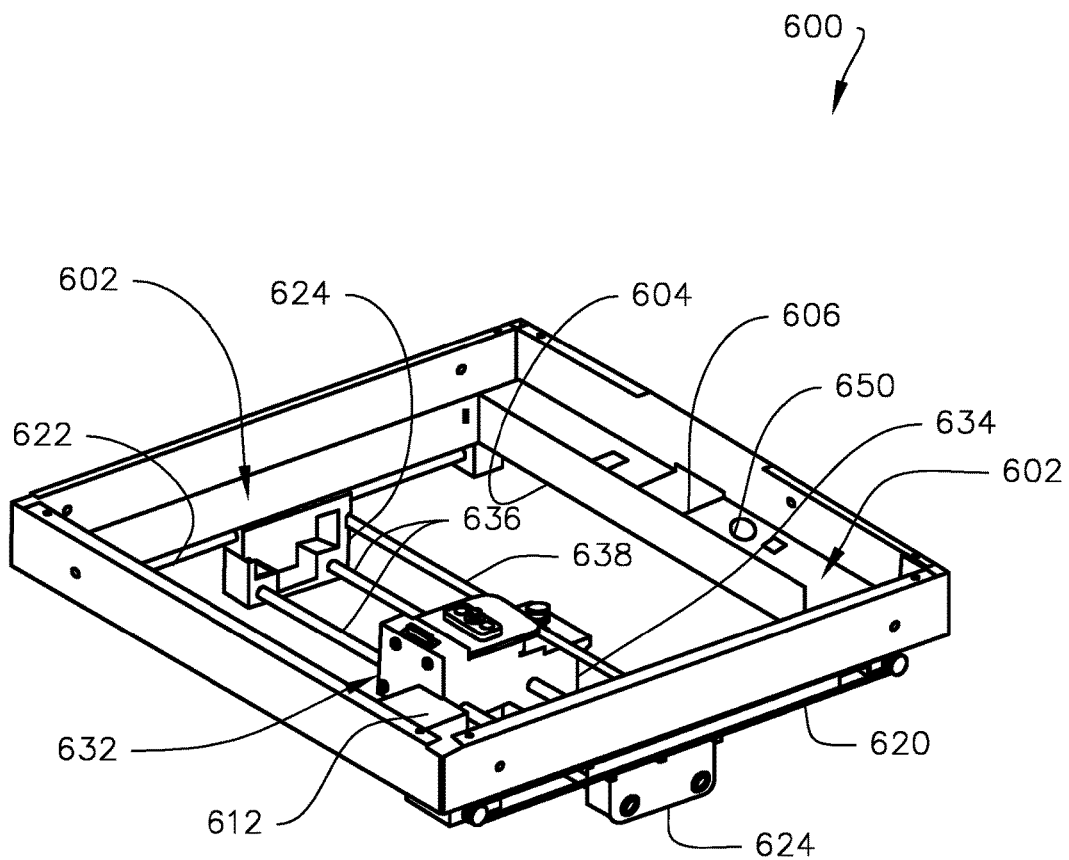
FIG. 6A may depict an embodiment of an alignment-plane for a printer for three dimensional printing, shown from a perspective view.
Figure 6B:
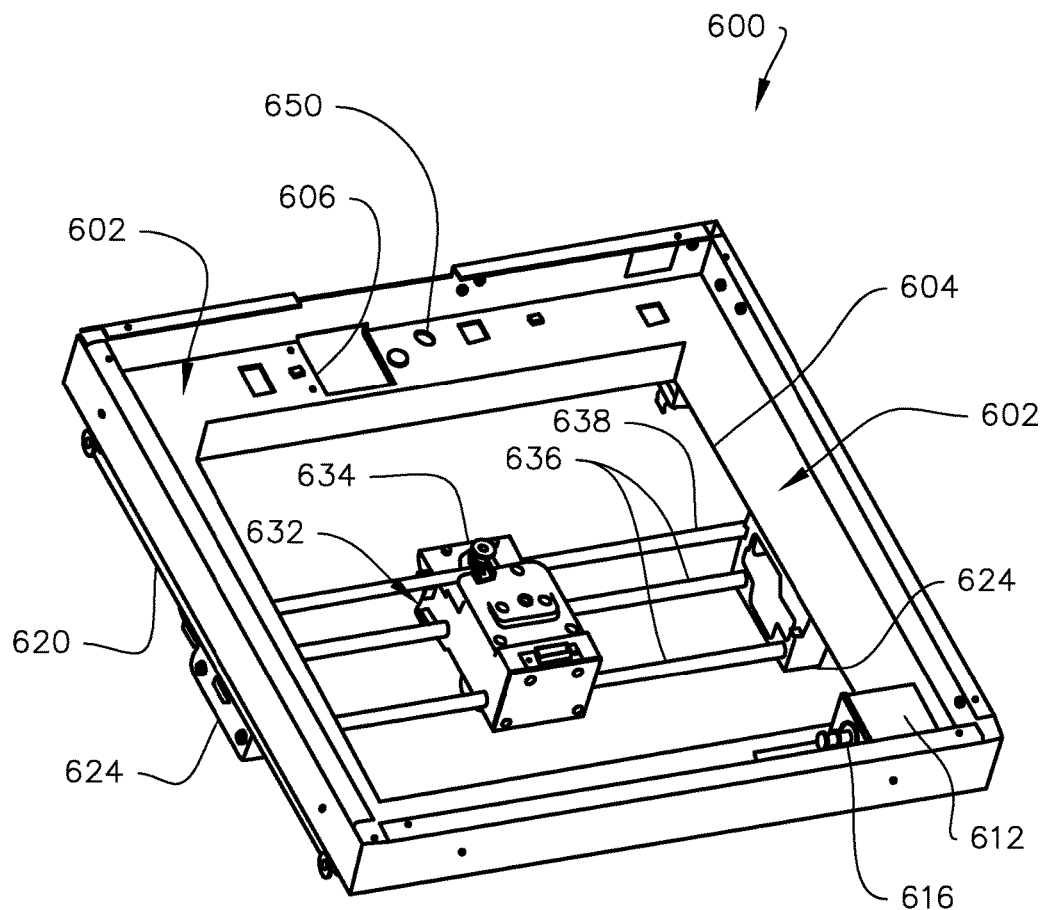
FIG. 6B may depict the alignment-plane of FIG. 6A, but shown in from a different perspective view that may be rotated by 90 degrees from the view of FIG. 6A.
Figure 6C:
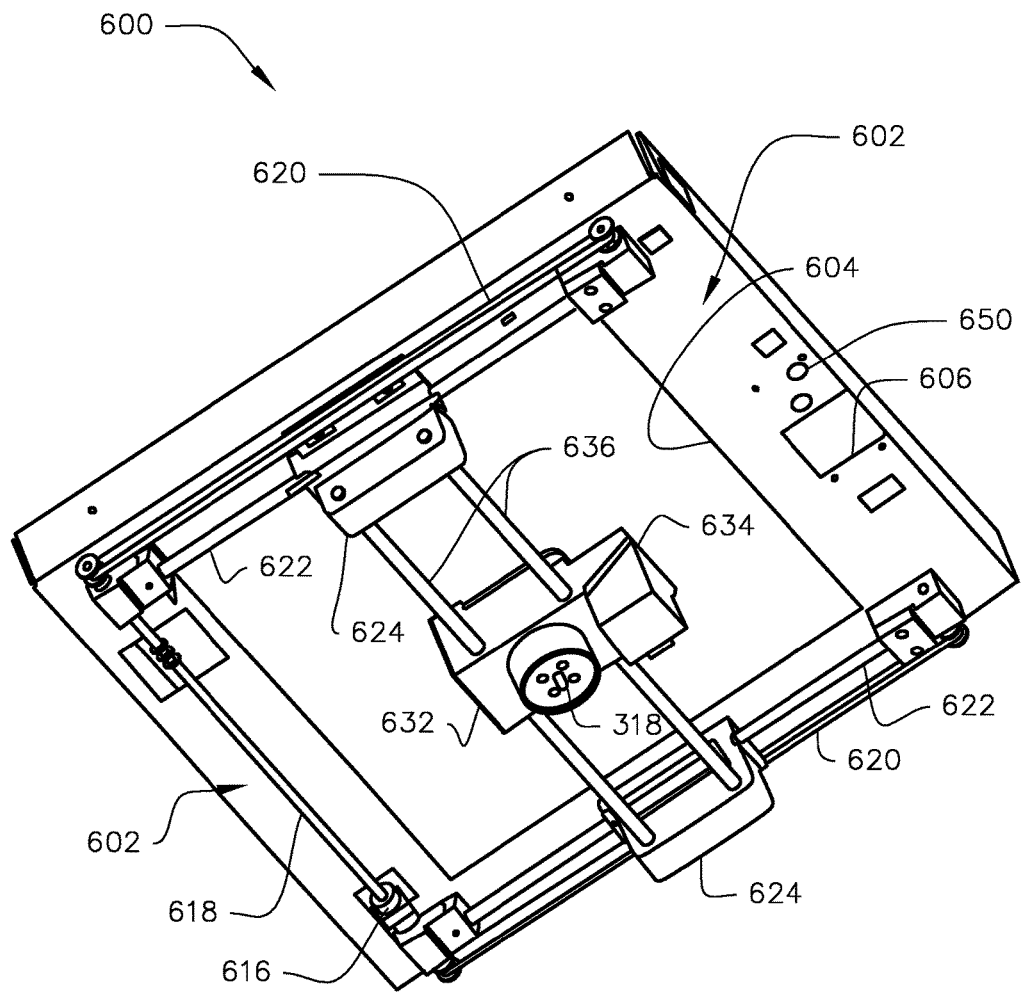
FIG. 6C may depict the alignment-plane of FIG. 6A, but shown in from a bottom perspective view.
Figure 6D:
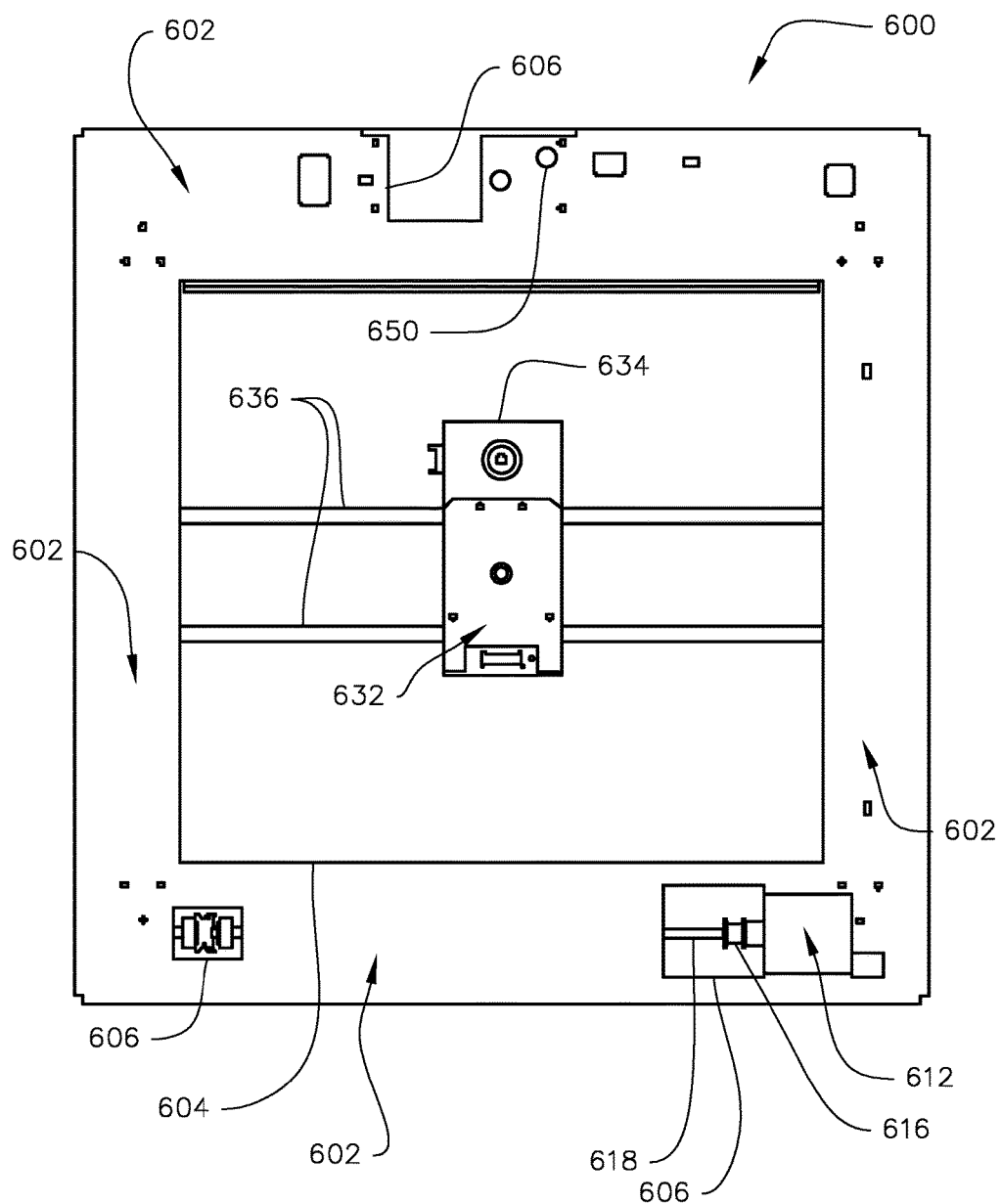
FIG. 6D may depict the alignment-plane of FIG. 6A, but shown in from a top view.
Figure 6E:
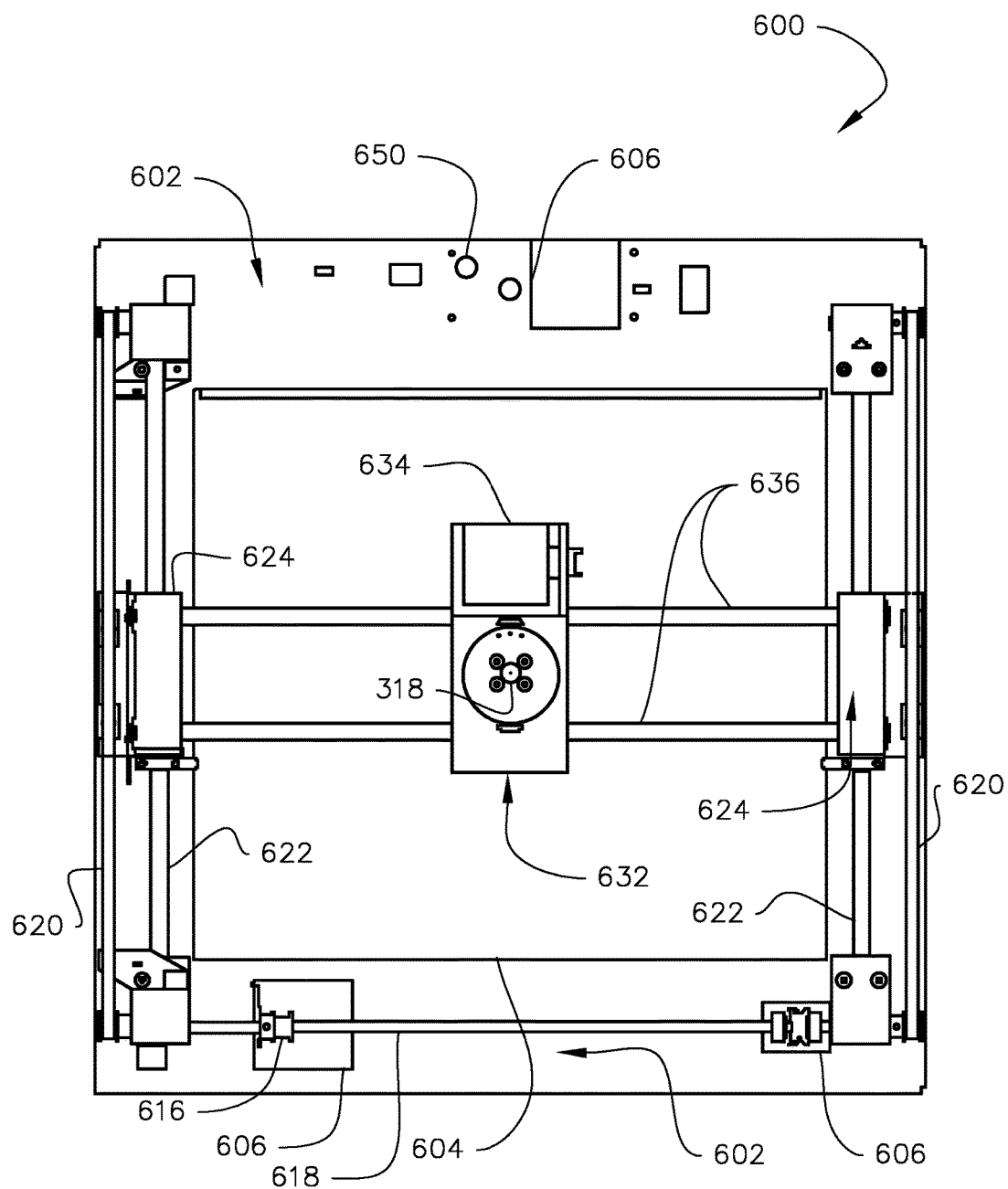
FIG. 6E may depict the alignment-plane of FIG. 6A, but shown in from a bottom view.

A FIG. 6 series of figures may comprise FIG. 6A through and including FIG. 6E. These FIG. 6 series of figures may depict an alignment-plane 600 of printer 100. Alignment-plane 600 embodiments may minimize problems of tolerance stacking by providing a common reference for some moving parts of printer 100, such as parts associated with x-axis, y-axis, and z-axis positions of one or more of extrusion core 300 and/or of build plate 502. For example, and without limiting the scope of the present invention, in some embodiments, a y-axis positioning system and a z-axis positioning system may tie into alignment-plane 600; and a x-axis positioning system may tie into the y-axis positioning system.

For example, and without limiting the scope of the present invention, extrusion core 300 may be moved in the x-axis directions and/or the y-axis directions (e.g., moved horizontally), and build plate 502 (with or without adhesion layer 508) may be moved along in a z-axis directions during layering to form the desired 3D printed object on top surface 506. Due to novel alignment-plane 600, the mechanical tolerance stack-ups of the x-axis, y-axis, and z-axis positioning systems are minimized; thereby minimizing the mechanical placement errors of each axis; which in turn results in greater fidelity of given 3D printer objects and with increased reproducibility from one printing run to a next printing run. For a given cost of manufacture, the positional accuracy is increased. As extrusion core 300 moves in the x-axis directions and/or the y-axis directions, nozzle 318 and top surface 506 separation distance, i.e., separation-gap 210, may be controlled to a predetermined acceptable tolerance and undesirable separation-gap 210 variances that reduce the quality of the 3D printed objects is minimized. The attachment of elements of the z-axis positioning system (e.g., mono-rail 702) onto alignment-plane 600 maintains top surface 506 in a substantially perpendicular orientation to nozzle 318.

For example, and without limiting the scope of the present invention, in one embodiment, central-carriage 632 (i.e., the x-axis carriage) may supports extrusion core 300 on the x-axis (e.g., supporting x-axis guides 636); and y-axis sliders 624 may supports the x-axis and the y-axis positioning system may attach directly to alignment-plane 600; and the z-axis (e.g., mono-rail 702) may attach directly to alignment-plane 600.

FIG. 6A may depict alignment-plane 600, shown from a perspective view (a top perspective view). FIG. 6B may depict alignment-plane 600, but shown in from a different perspective view that may be rotated by 90 degrees from the view of FIG. 6A. FIG. 6C may depict alignment-plane 600, but shown in from a bottom perspective view. FIG. 6D may depict alignment-plane 600, but shown in from a top view. FIG. 6E may depict alignment-plane 600, but shown in from a bottom view.

In some embodiments, alignment-plane 600 may comprise a planar-member 602. See e.g., any of the FIG. 6 figures. In some embodiments, planar-member 600 may be substantially rigid. In some embodiments, major surfaces planar-member 600 may be substantially parallel with top surface 506 of build plate 502 of printer 100. In some embodiments, major surfaces planar-member 600 may be substantially parallel with a major surface of bottom 120 of printer 100. In some embodiments, planar-member 600 may be disposed above build plate 502. In some embodiments, planar-member 600 may be disposed above bottom 120. See e.g., FIG. 2A, FIG. 2B, and FIG. 2C.

In some embodiments, planar-member 602 provides regions within a same plane, i.e., a common plane, for attachment of one or more of: a y-axis positioning system, an x-axis positioning system, and/or for an upper portion of a z-axis positioning system. In some embodiments, planar-member 602 provides regions within a same plane, i.e., a common plane, for attachment of: the y-axis positioning system and/or for the upper portion of a z-axis positioning system; and the x-axis positioning system may attach to the y-axis positioning system. See generally the FIG. 6 figures. As noted having one or more of such axis positioning systems attach, anchor, and/or tie into a common plane such as planar-member 602 minimizes tolerance stacking problems associated when components of such axis positioning systems attach, anchor, and/or tie into different planes. Use of the common plane of planar-member 602 increases 3D printing reproducibility such that dimensional tolerances on 3D printer objects remain within a more narrower range tolerances as compared against art that attaches, anchors, and/or ties in the components of axis positioning systems to diverse planes.

Note, in some embodiments, y-axis positioning systems and x-axis positioning systems may move central-carriage 632 in directions within a horizontal plane, i.e., forwards or backwards and/or left or right. Note, in some embodiments, z-axis positioning systems (e.g., z-axis positioning system 700) may move build plate 502 in a vertical direction, i.e., up or down.

In some embodiments, planar-member 602 may be attached to one or more structural-frame-members of printer 100. In some embodiments, planar-member 602 may be attached to structure 102 of printer 100. In some embodiments, planar-member 602 may be attached to one or more members 103 of printer 100. In some embodiments, planar-member 602 may be attached to at least two opposing members 103 of printer 100. In some embodiments, planar-member 602 may be attached to four different members 103 of printer 100. In some embodiments, attachment of planar-member 602 to structure 102 and/or to one or more members 103, may be closer to a top of printer 100 than to bottom 120 of printer 100. In some embodiments, planar-member 602 may be fixed with respect to structure 102 of printer 100. See e.g., FIG. 1A, FIG. 1E, FIG. 2A, FIG. 2B, and FIG. 2C.

In some embodiments, alignment-plane 600 may comprise the y-axis positioning system. In some embodiments, portions of the y-axis positioning system may attach, anchor, and/or tie into planar-member 602.

In some embodiments, the y-axis positioning system may comprise: a y-axis motive means 612, a pair of opposing y-axis guides 622, a pair of opposing y-sliders 624, and a y-axis drivetrain. In some embodiments, y-axis motive means 612 may be attached to planar-member 602. See e.g., FIG. 6A, FIG. 6B, and FIG. 6D. In some embodiments, each of the y-axis guides 622 may be attached to the planar-member 602. In some embodiments, each of the y-axis guides 622 may be substantially parallel with each other. See e.g., FIG. 6C. In some embodiments, each of the y-axis guides 622 may be substantially rigid. In some embodiments, each of the y-axis guides 622 may be substantially linearly straight. In some embodiments, each of the y-sliders 624 may be in communication and may be guided by one of the respective y-axis guides 622. See e.g., FIG. 6C.

In some embodiments, a portion (e.g., a linkage-belt 616) of the y-axis drivetrain may link y-axis motive means 612 to each of the y-sliders 624, such that the y-sliders 624 may translate with or along the y-axis guides 622. In some embodiments, portions of the y-axis drivetrain main comprise one or more: linkage-belt 616, y-axis drive shaft 618, y-axis belt(s) 620, wheels, and/or pulleys. In some embodiments, each y-slider 624, which may be guided by a respective y-axis guide 622, may be translated via a respective y-axis belt 620. In some embodiments, y-axis belts 620 may be opposing y-axis belts 620. In some embodiments, two opposing y-axis belts 620 may be substantially parallel with each other. In some embodiments, each of the y-axis belts 620 may be substantially parallel with a longitude of each of the y-axis guides 622. See e.g., FIG. 6A, FIG. 6B, FIG. 6C, FIG. 6D, and FIG. 6E. For example, and without limiting the scope of the present invention, in some embodiments, y-axis motive means 612 may link with linkage-belt 616 and cause linkage-belt 616 to translate; linkage-belt 616 may link with y-axis drive shaft 618 and cause y-axis drive shaft 618 to spin; y-axis drive shaft 618 may link with opposing wheels and may turn opposing wheels; the opposing wheels may link with a given y-axis belt 620 and cause each given y-axis belt 620 to translate; each given y-axis belt 620 may link with an impart translation to a respective y-slider 624. In some embodiments, y-axis motive means 612 may comprise a motor, such as, but not limited to a stepper motor. In some embodiments, the y-axis positioning system may comprise different components and/or different y-axis drivetrain components. For example, and without limiting the scope of the present invention, in some embodiments the y-axis positioning system may comprise one or more: motors, stepper motors, drive screws, pistons, gears, bearings, linkages, belts, wheels, pulleys, transmissions, and/or the like.

In some embodiments, alignment-plane 600 may comprise the x-axis positioning system. In some embodiments, the x-axis positioning system may be substantially disposed between the pair of opposing y-sliders 624. That is, in some embodiments, each y-slider 624 may act as a carriage for portions of the x-axis positioning system. In some embodiments, the x-axis positioning system comprises: a central-carriage 632 and x-axis guide 636. In some embodiments, the x-axis positioning system comprises: a central-carriage 632, x-axis guide 636, and x-axis belt 638. In some embodiments, central-carriage 632 may be the x-axis carriage. In some embodiments, each central-carriage 632 may comprise at least one extrusion core 300. In some embodiments, each central-carriage 632 may comprise at least one x-axis motive means 634. In some embodiments, x-axis motive means 634 may cause central-carriage 632 to translate along x-axis belt 638. In some embodiments, opposing ends of x-axis belt 638 may each be located at a respective y-slider 624. See e.g., FIG. 6A and FIG. 6B. (Note, x-axis belt 638 is not shown in the other FIG. 6 series figures.) In some embodiments, x-axis guide 636 may be substantially rigid. In some embodiments, x-axis guide 636 may be substantially linearly straight. In some embodiments, x-axis guide 636 may be an elongate member, with opposing terminal ends. Each such respective opposing terminal end of x-axis guide 636 may be attached to a respective y-slider 624. In some embodiments, central-carriage 632 may be in communication with x-axis guide 636, such that a direction of movement for central-carriage 632 is governed by a longitude of x-axis guide 636. In some embodiments, central-carriage 632 may comprise a through-hole for receiving portions of x-axis guide 636, such that central-carriage 632 may slide along x-axis guide 636. In some embodiments, there may be two x-axis guides 636, i.e., a pair of spaced x-axis guides 636. In some embodiments, the pair of spaced x-axis guides 636 may be substantially parallel with each other. In some embodiments, the pair of spaced x-axis guides 636 may each be an elongate member, each with its own opposing terminal ends. Each such respective opposing terminal end of a given x-axis guide 636 may be attached to a respective y-slider 624. In some embodiments, central-carriage 632 may be in communication with x-axis guides 636, such that the direction of movement for central-carriage 632 is governed by the substantially parallel longitudes of the pair of spaced x-axis guides 636. In some embodiments, central-carriage 632 may comprise a pair of spaced through-holes for receiving portions of each x-axis guide 636, such that central-carriage 632 may slide along the pair of spaced x-axis guides 636. See e.g., FIG. 6C and FIG. 6E.

In some embodiments, x-axis motive means 634 may comprise one or more: a motor, a stepper motor, a piston, and/or the like. In some embodiments, x-axis belt 638 may be replaced with a drive screw linked to x-axis motive means 634. In some embodiments, 634 may be attached to a given y-slider 624 and not part of central-carriage 632. In some embodiments, the x-axis positioning system may comprise various x-axis drivetrain components, such as but not limited to one or more of: motors, stepper motors, drive screws, pistons, gears, bearings, linkages, belts, wheels, pulleys, transmissions, and/or the like.

In some embodiments, planar-member 602 may comprise one central major hole 604. See e.g., any of the FIG. 6 series of figures. In some embodiments, portions of central-carriage 632 may be located within this one central major hole 604. In some embodiments, central-carriage 632 may translate in the y-axis and/or in the x-axis directions within this one central major hole 604. In some embodiments, planar-member 602 may comprise one or more minor holes 606. See e.g., any of the FIG. 6 series of figures. For example, and without limiting the scope of the present invention, one such minor hole in planar-member 602 may be to accommodate portions of z-axis motive means 708. In some embodiments, planar-member 602 may comprise a hole and/or structure to receive and/or anchor a top portion of mono-rail 702; wherein this hole and/or structure may be z-axis tie-end 650.

In some embodiments, planar-member 602 may be substantially constructed from one or more sheets of metal. In some embodiments, planar-member 602 may be substantially constructed from one or more sheets of aluminum. For example, and without limiting the scope of the present invention, in some embodiments, planar-member 602 may be substantially constructed from a sheet of aluminum at least substantially 0.063 inches thick. For example, and without limiting the scope of the present invention, in some embodiments, planar-member 602 may be substantially constructed from 5052-H32 aluminum.

In some embodiments, planar-member 602 may be substantially constructed from one or more sheets of thermoformed plastics; which may comprise various fillers for added rigidity (e.g., glass fibers) and/or may comprise various rigidity reinforcement structures (e.g., ribbing).

Figure 7A:
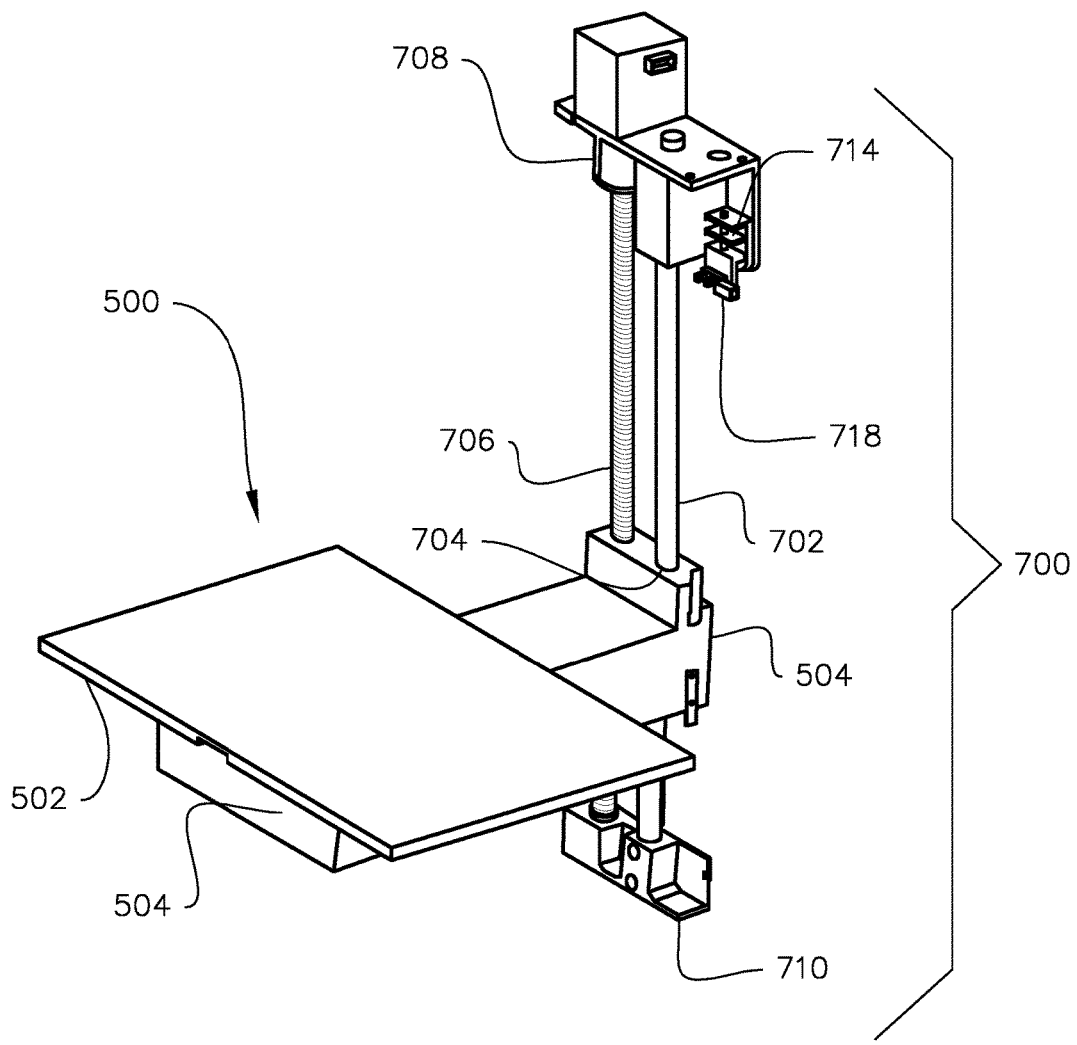
FIG. 7A may depict an embodiment of a z-axis positioning system for a printer for three dimensional printing, shown from a perspective view.
Figure 7B:
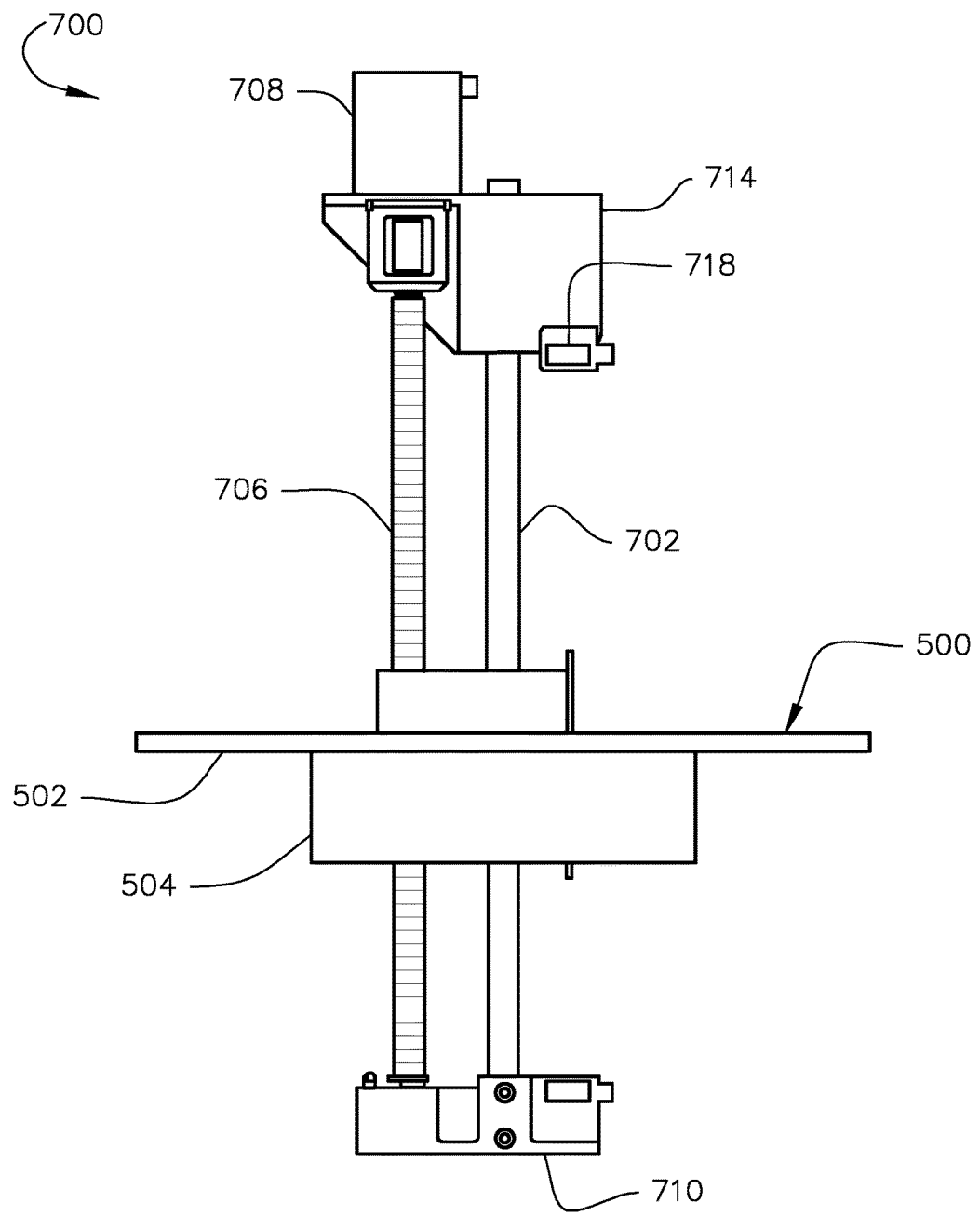
FIG. 7B may depict the z-axis positioning system of FIG. 7A, but shown from a front view.
Figure 7C:
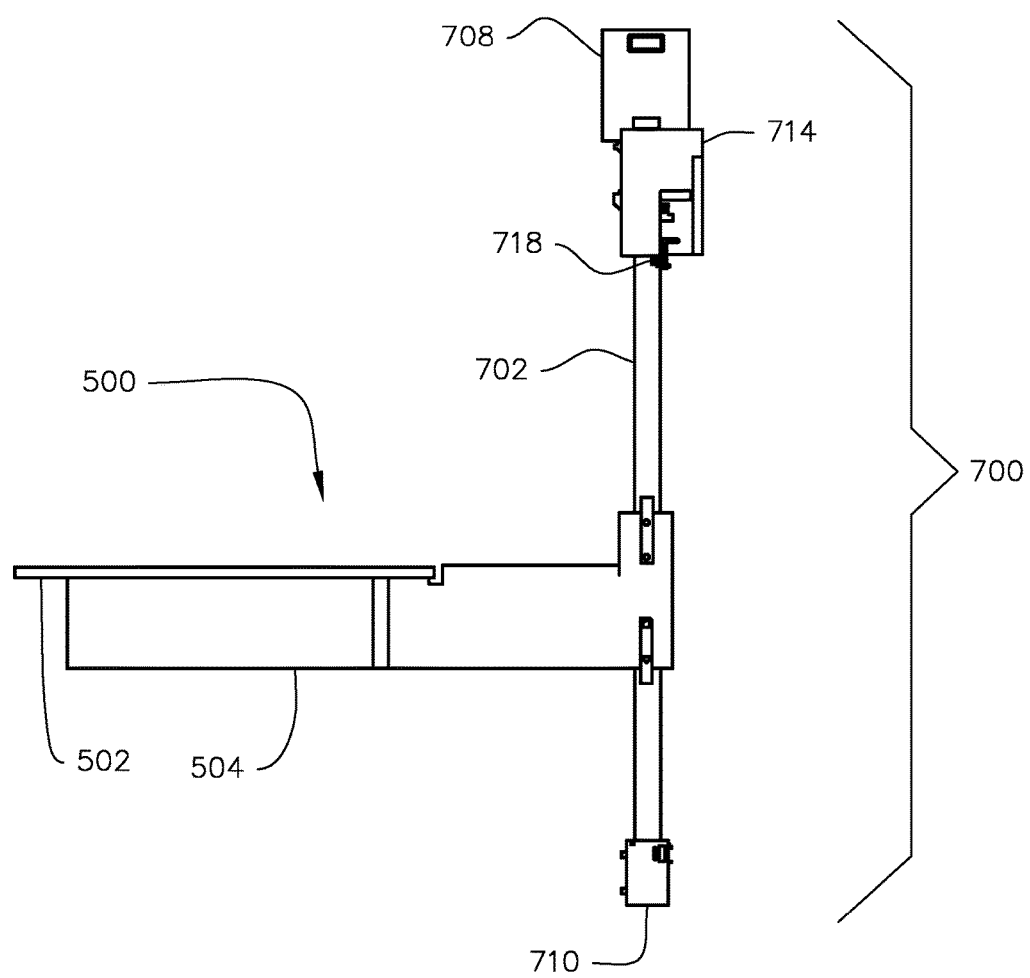
FIG. 7C may depict the z-axis positioning system of FIG. 7A, but shown from a right view.
Figure 7D:
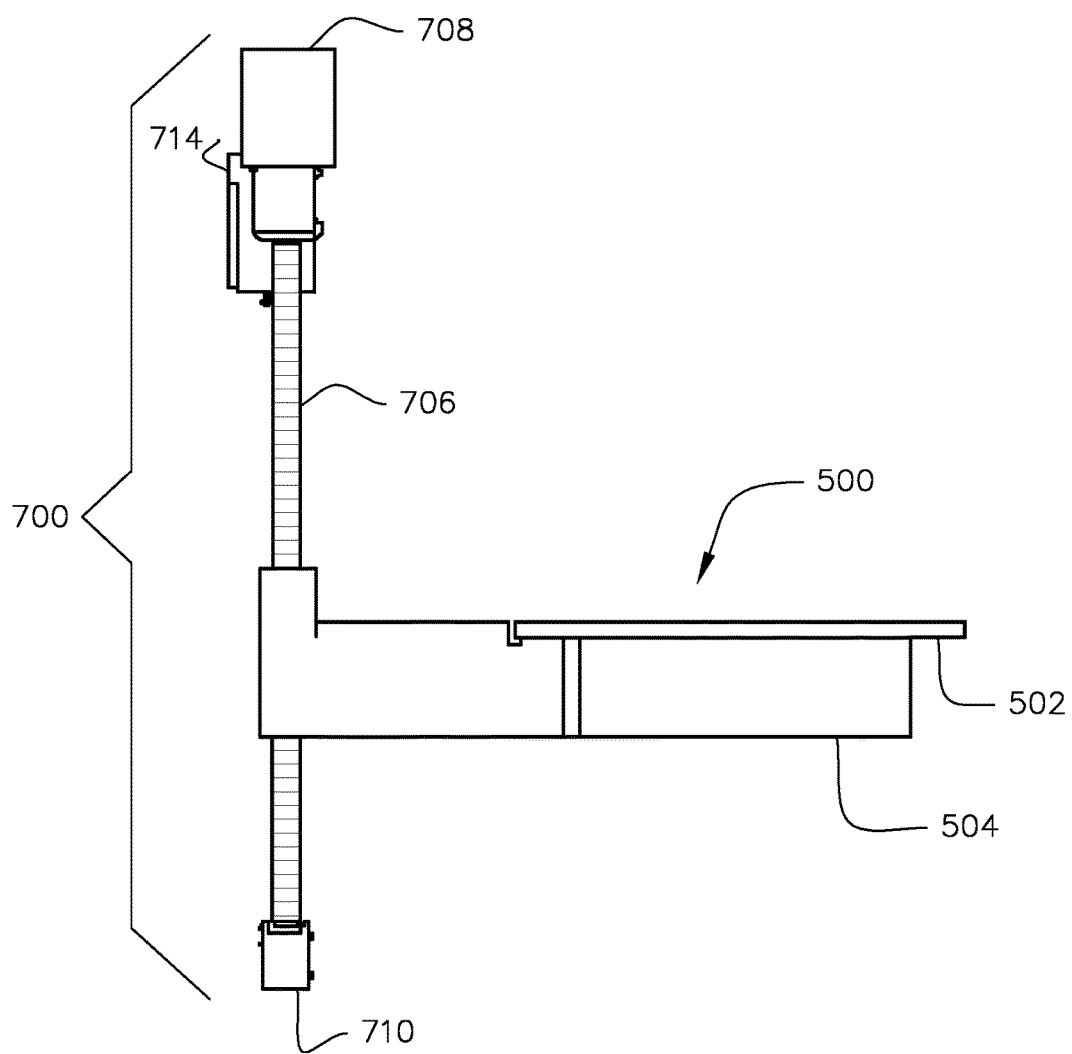
FIG. 7D may depict the z-axis positioning system of FIG. 7A, but shown from a left view.
Figure 7E:
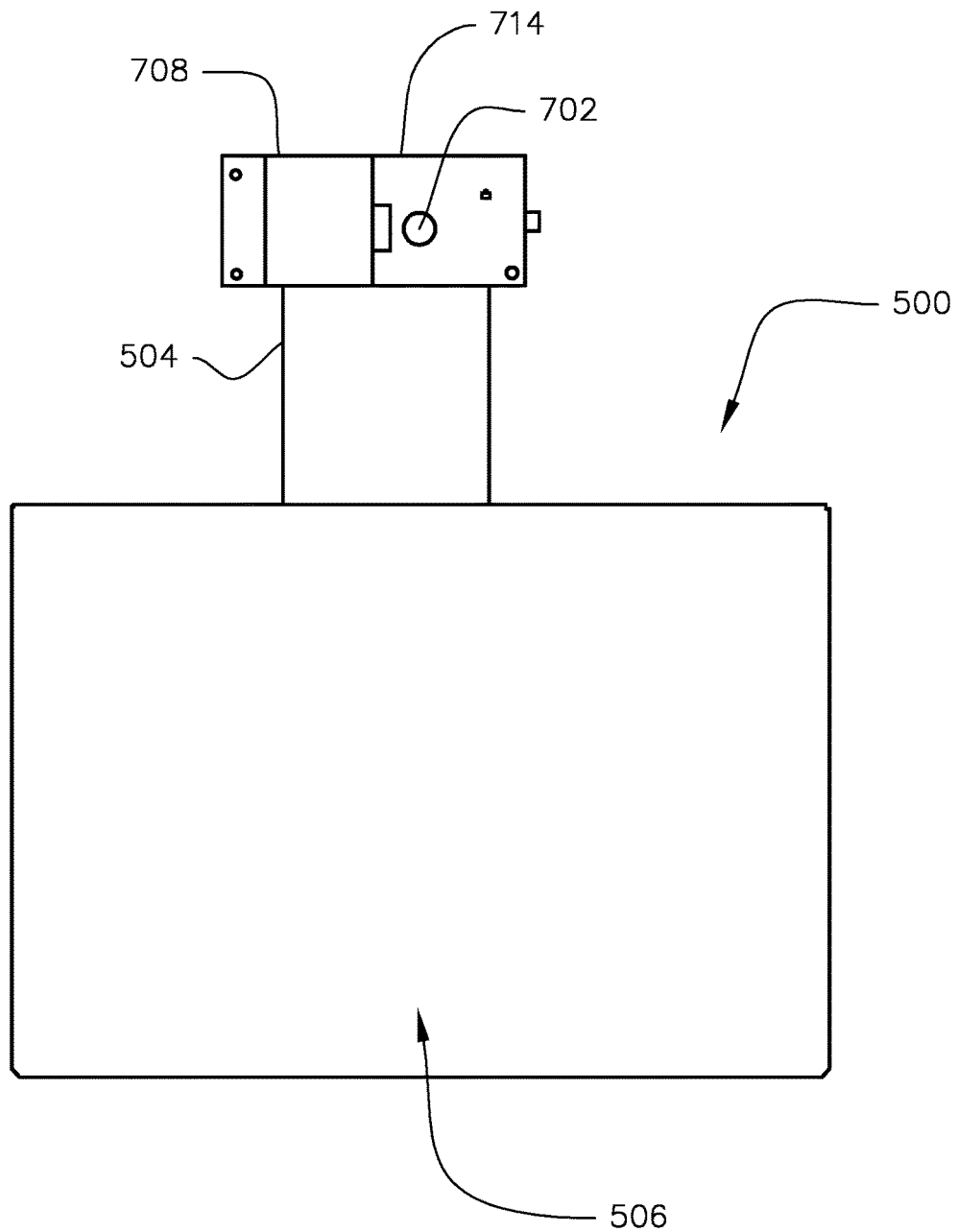
FIG. 7E may depict the z-axis positioning system of FIG. 7A, but shown from a top view.

A FIG. 7 series of figures may comprise FIG. 7A through and including FIG. 7E. These FIG. 7 series of figures may depict an embodiment of z-axis positioning system 700 of printer 100. FIG. 7A may depict z-axis positioning system 700, shown from a perspective view (specifically a top, front, right perspective view). FIG. 7B may depict z-axis positioning system 700, but shown from a front view. FIG. 7C may depict z-axis positioning system 700, but shown from a right view. FIG. 7D may depict z-axis positioning system 700, but shown from a left view. FIG. 7E may depict z-axis positioning system 700, but shown from a top view.

Embodiments of z-axis positioning system 700 may be solving a problem associated with prior art 3D printers that utilize two or more z-axis guides. When two or more z-axis guides may be employed, that necessarily means two or more means to engage the two or more z-axis guides, such as two or more complimentary receiving sleeves that couple with portions of the two or more z-axis guides. And because of inherent tolerances associated with any complimentary receiving sleeve manufacturing technique and the necessary mechanical fit between the given complimentary receiving sleeve and the given z-axis guide, such that the mechanical fit must permit sliding translation, each such complimentary receiving sleeve and its fit to a given z-axis guide will have some associated tolerances and thus when two or more such sleeves are utilized there must be tolerance stacking. Additionally, when two or more z-axis guides are utilized, an additional tolerance stacking problem is introduced arising from positional or locational tolerances associated with locations of second or more complimentary receiving sleeves. Some embodiments of z-axis positioning system 700 may solve or minimize these tolerance stacking problems by only utilizing one single z-axis guide, a mono-rail 702, as opposed to using two or more such z-axis guides. For example, use of the single mono-rail 702, completely eliminates the positional error problem of having two or more complimentary receiving sleeves to place; and use of the single mono-rail 702 means the mechanical fit tolerances between mono-rail 702 and mono-rail-sleeve 704 may be reduced in comparison to if more than one z-axis guide was used; and thus, wobble between a plane of top surface 506 and the x-y plane of planar-member 602 may also be reduced.

Note, use of one single mono-rail 702 is also an unexpected result because conventional wisdom in the art was that a single z-axis guide was undesirable, because in order to avoid a given build plate acting as a lever arm upon a single z-axis guide, a single z-axis guide should be positioned to pass through a center of the build plate; which is not a workable solution as then the single z-axis guide is in the way of printing; so any pass through type z-axis guides must be located off-center from given build plate; which then introduce a problem of dealing with lever arm loads from the build plate (and its contents) being place upon the z-axis guides; and thus, the more z-axis guides and the more evenly they are placed with respect to the center of the given build plate, the more loads from the build plate are evenly distributed. And so the present solution of a single mono-rail 702 solution is an unexpected result. And in particular, in some embodiments, use of a single mono-rail 702 that is off center from a center of top surface 506 is an unexpected result.

As noted, in some embodiments of printer 100, printer 100 may comprise a given build plate subassembly 500 and a given z-axis positioning system (e.g., 700), which may cause a build plate 502 to translate in the z-axis direction. In some embodiments, the z-axis direction may be vertical direction, i.e., an up or down direction, with respect to a given substrate that the given printer 100 may be on top of. In some embodiments, the z-axis direction may be vertical direction, i.e., an up or down direction, with respect to a bottom 120 of the given printer 100.

In some embodiments, major surfaces of bottom 120 may be substantially flat. In some embodiments, major surfaces of bottom 120 may be substantially horizontal. That is, in some embodiments, major surfaces of bottom 120 may extend in the x-axis and in the y-axis directions. Note: when a given printer (e.g., 100) may be resting upon a substantially level substrate, a position of build plate 502 may be varied in the vertical direction (i.e., the z-axis direction) with respect to this supporting substrate.

In some embodiments, z-axis positioning system 700 may vary vertical position of build plate 502 within predetermined vertical limits. For example, and without limiting the scope of the present invention, z-axis positioning system 700 may not vary build plate 502 below bottom 120 nor may z-axis positioning system 700 cause build plate 502 to rise above planar-member 602. See e.g., FIG. 2A, FIG. 2B, and FIG. 2C.

In some embodiments, z-axis positioning system 700 may comprise: mono-rail 702 and z-axis positioner 706. In some embodiments, z-axis positioning system 700 may comprise: mono-rail 702, z-axis positioner 706, and z-axis motive means 708; or alternatively, in some embodiments, z-axis positioner 706 may comprise z-axis motive means 708. See e.g., FIG. 7A, FIG. 7B, FIG. 7C, and FIG. 7D.

In some embodiments, mono-rail 702 may be a singular elongate member with opposing terminal ends. In some embodiments, mono-rail 702 may be substantially rigid. In some embodiments, mono-rail 702 may be substantially an elongate member. In some embodiments, mono-rail 702 may be substantially linearly straight. In some embodiments, a longitude of mono-rail 702 may be positioned substantially vertically with respect to bottom 120. In some embodiments, the longitude of mono-rail 702 may be positioned substantially perpendicularly with respect to a major surface of bottom 120. In some embodiments, the longitude of mono-rail 702 may be positioned substantially perpendicularly with respect to a major surface of planar-member 602. In some embodiments, the longitude of mono-rail 702 may be positioned substantially perpendicularly with respect to longitudes of y-axis guides 622 and/or of x-axis guides 636. In some embodiments, longitudes of mono-rail 702, y-axis guides 622, and x-axis guides 636 may be substantially orthogonal with respect to each other. See e.g., FIG. 7A, FIG. 7B, FIG. 7C, and FIG. 7D.

In some embodiments, portions of mono-rail 702 may pass through a mono-rail-sleeve 704 located in a region of bed 504. See e.g., FIG. 7A. These portions of mono-rail 702 may be disposed the opposing terminal ends of mono-rail 702. In some embodiments, portions of mono-rail 702 may pass through mono-rail-sleeve 704 located in a region of build plate 502. In some embodiments, sleeve mono-rail-sleeve 704 may be located in bed 504 and in build plate 502. A transverse width cross-sectional fit between mono-rail-sleeve 704 and mono-rail 702 may permit sliding translation of mono-rail-sleeve 704 along some portions of mono-rail 702. In some embodiments, the transverse width cross-section of mono-rail-sleeve 704 may be larger than the transverse width cross-section of the portions of mono-rail 702 that may be received in mono-rail-sleeve 704. In some embodiments, the longitude of mono-rail 702 is a vertical direction guide for movement of build plate 502.

In some embodiments, z-axis motive means 708 may cause build plate 502 to move in the vertical direction, guided by mono-rail 702. In some embodiments, z-axis motive means 708 may comprise one or more: motors, stepper motors, drive screws, pistons, gears, bearings, linkages, belts, wheels, pulleys, transmissions, and/or the like. In some embodiments, z-axis positioner 706 may comprise one or more: drive screws, pistons, gears, bearings, linkages, belts, wheels, pulleys, transmissions, and/or the like. For example, and without limiting the scope of the prevent invention, in some embodiments, z-axis motive means 708 may be a motor, such as a stepper motor; and z-axis positioner 706 may be a vertical-drive-screw in communication with z-axis motive means 708. See e.g., FIG. 7A, FIG. 7B, FIG. 7C, and FIG. 7D. In some embodiments, a complimentary threaded hole in bed 504 may receive portions of this vertical-drive-screw; however, mechanical fit tolerances between this pairing may be less than the mechanical fit tolerances between portions of mono-rail 702 and mono-rail-sleeve 704. In some embodiments, when this vertical-drive-screw is rotated by 708 build plate 502 moves vertically. In some embodiments, a longitude of this vertical-drive-screw may be substantially parallel with the longitude of mono-rail 702. In some embodiments, the longitude of this vertical-drive-screw may be positioned substantially vertically with respect to bottom 120. In some embodiments, the longitude of this vertical-drive-screw may be positioned substantially perpendicularly with respect to the major surface of bottom 120. In some embodiments, the longitude of this vertical-drive-screw may be positioned substantially perpendicularly with respect to the major surface of planar-member 602. In some embodiments, the longitude of this vertical-drive-screw may be positioned substantially perpendicularly with respect to the longitudes of y-axis guides 622 and/or of x-axis guides 636. In some embodiments, this vertical-drive-screw may be an elongate member with opposing terminal ends. In some embodiments, this vertical-drive-screw may be a single elongate member. In some embodiments, this vertical-drive-screw may be threaded. In some embodiments, this vertical-drive-screw may be substantially rigid.

In some embodiments, z-axis positioning system 700 may further comprise bottom-anchor 710 and top-anchor 714. In some embodiments, a bottom terminal end of mono-rail 702 may be retained in bottom-anchor 710. In some embodiments, a bottom terminal end of z-axis positioner 706 may be retained in bottom-anchor 710. In some embodiments, bottom-anchor 710 may comprise structure and/or geometry that operates as a physical stop for bed 504 (or for build plate 502), such that bed 504 may not move further downwards when a structure of bed 504 butts up against this physical stop of bottom-anchor 710. See e.g., FIG. 7A. In some embodiments, bottom-anchor 710 may be attached to bottom 120 and/or to back 124. See e.g., FIG. 2A, FIG. 2B, and FIG. 2C.

In some embodiments, a top terminal end of mono-rail 702 may be retained in top-anchor 714. In some embodiments, a top terminal end of z-axis positioner 706 may be retained in top-anchor 714 and/or in z-axis motive means 708. In some embodiments, top-anchor 714 may comprise structure and/or geometry that operates as a physical stop 718 for bed 504 (or for build plate 502), such that bed 504 may not move further upwards when a structure of bed 504 butts up against this physical stop 718 of top-anchor 714. See e.g., FIG. 7A. In some embodiments, top-anchor 714 may be attached to planar-member 602 and/or to back 124. In some embodiments, the top terminal end of mono-rail 702 may be anchored to planar-member 602; specifically at z-axis tie-end 650. See e.g., FIG. 2A, FIG. 2B, and FIG. 2C.

In some embodiments, top-anchor 714 may comprise a separation-gap-sensor; wherein the separation-gap-sensor may sense a distance between nozzle 318 and a top portion (e.g., top surface 506) of the build plate 502. That is, this separation-gap-sensor may determine separation-gap 210. In some embodiments, this separation-gap-sensor may sense a distance between nozzle 318 and a top portion of adhesion-layer 508 (e.g., top surface 506).

Figure 8A:
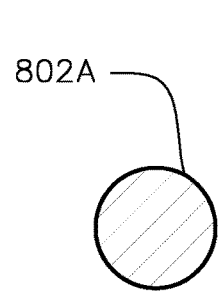
FIG. 8A may depict a transverse width cross-section of a mono-rail; wherein the mono-rail in this embodiment may be circular.
Figure 8B:
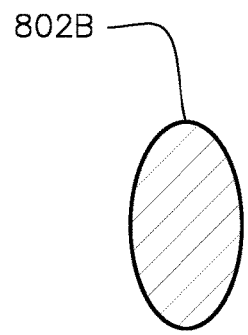
FIG. 8B may depict a transverse width cross-section of a mono-rail; wherein the mono-rail in this embodiment may be oval.
Figure 8C:
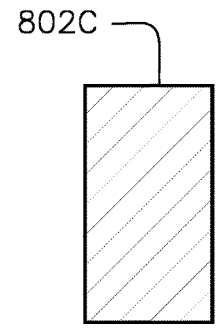
FIG. 8C may depict a transverse width cross-section of a mono-rail; wherein the mono-rail in this embodiment may be rectangular.
Figure 8D:
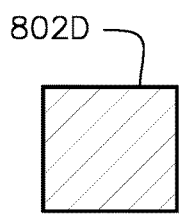
FIG. 8D may depict a transverse width cross-section of a mono-rail; wherein the mono-rail in this embodiment may be squarish.
Figure 8E:
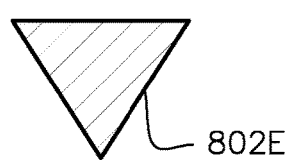
FIG. 8E may depict a transverse width cross-section of a mono-rail; wherein the mono-rail in this embodiment may be triangular.
Figure 8F:
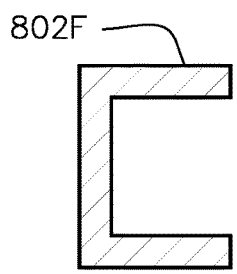
FIG. 8F may depict a transverse width cross-section of a mono-rail; wherein the mono-rail in this embodiment may be "C" shaped.
Figure 8G:
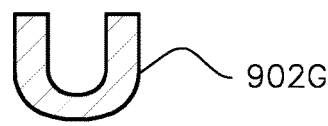
FIG. 8G may depict a transverse width cross-section of a mono-rail; wherein the mono-rail in this embodiment may be "U" shaped.

A FIG. 8 series of figures may comprise FIG. 8A through and including FIG. 8G. These FIG. 8 series of figures may depict different transverse width cross-sectional shapes for mono-rail 702. FIG. 8A may depict a transverse width cross-section of a mono-rail 802A; wherein the transverse width cross-section shape of mono-rail 802A may be circular. FIG. 8B may depict a transverse width cross-section of a mono-rail 802b; wherein the transverse width cross-section shape of mono-rail 802B may be oval. FIG. 8C may depict a transverse width cross-section of a mono-rail 802C; wherein the transverse width cross-section shape of mono-rail 802C may be rectangular. FIG. 8D may depict a transverse width cross-section of a mono-rail 802D; wherein the transverse width cross-section shape of mono-rail 802D may be squarish. FIG. 8E may depict a transverse width cross-section of a mono-rail 802E; wherein the transverse width cross-section shape of mono-rail 802E may be triangular. FIG. 8F may depict a transverse width cross-section of a mono-rail 802F; wherein the transverse width cross-section shape of mono-rail 802F may be "C" shaped. FIG. 8G may depict a transverse width cross-section of a mono-rail 802G; wherein the transverse width cross-section shape of mono-rail 802G may be "U" shaped.

Note, when the transverse width cross section of mono-rail 702 may be circular, e.g., as in mono-rail 802A, inclusion of portions of z-axis positioner 706 through bed 504 may prevent unintended or undesirable rotational movement of build plate 502.

In some embodiments, the transverse width cross-section of mono-rail 702 may be selected from a shape selected from the group consisting of: a circle, an oval, an ellipse, a rectangle, a square, a triangle, a letter "C," a letter "U," a regular polygon, an irregular polygon, and/or the like. Such shapes may have rounded or non-rounded corners. In some embodiments, a transverse width cross-section of mono-rail-sleeve 704 may be a complimentary shape to the transverse width cross-section of the given mono-rail 702 shape.

Figure 9C:
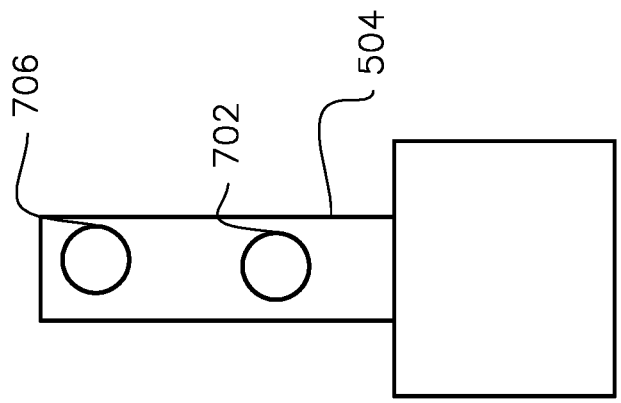
FIG. 9C may depict an embodiment of a relationship between a mono-rail, a z-axis positioner and a bed, shown from a top view.
Figure 9B:
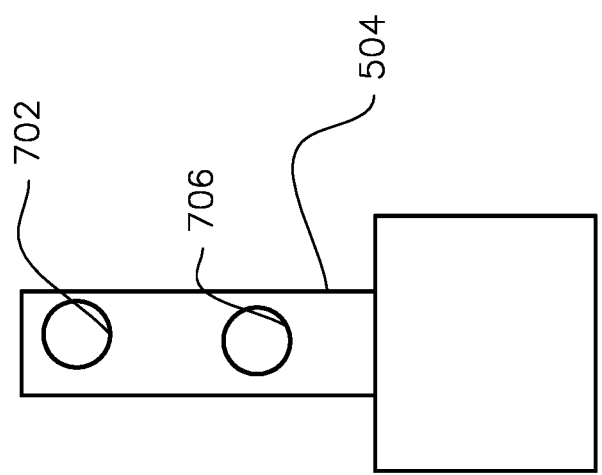
FIG. 9B may depict an embodiment of a relationship between a mono-rail, a z-axis positioner and a bed, shown from a top view.
Figure 9A:
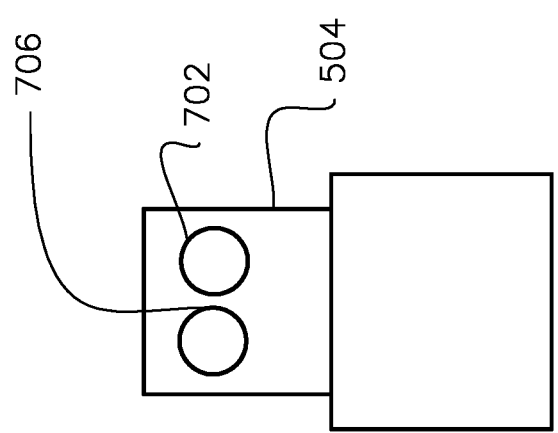
FIG. 9A may depict an embodiment of a relationship between a mono-rail, a z-axis positioner and a bed, shown from a top view.

A FIG. 9 series of figures may comprise FIG. 9A through and including FIG. 9C. These FIG. 9 series of figures may depict different configuration relationships between mono-rail 702, z-axis positioner 706 and bed 504.

FIG. 9A may depict an embodiment of a relationship between mono-rail 702, z-axis positioner 706 and bed 504, shown from a top view. In some embodiments, mono-rail 702 and z-axis positioner 706 may be positioned such that both mono-rail 702 and z-axis positioner 706 may be substantially a same equal distance from a same point on bed 504 (or from a same point on build plate 502). See e.g., FIG. 9A.

FIG. 9B may depict an embodiment of a relationship between mono-rail 702, z-axis positioner 706 and bed 504, shown from a top view. In some embodiments, z-axis positioner 706 may be positioned closer to a front of bed 504 as compared against mono-rail 702. In some embodiments, z-axis positioner 706 may be positioned closer to build plate 502 as compared against mono-rail 702. See e.g., FIG. 9B.

FIG. 9C may depict an embodiment of a relationship between mono-rail 702, z-axis positioner 706 and bed 504, shown from a top view. In some embodiments, mono-rail 702 may be positioned closer to a front of bed 504 as compared against z-axis positioner 706. In some embodiments, mono-rail 702 may be positioned closer to build plate 502 as compared against z-axis positioner 706. See e.g., FIG. 9C.

Note: with respect to the materials of construction noted herein, it is not desired nor intended to thereby unnecessarily limit the present invention by reason of such disclosure.

Printers for three dimensional (3D) printing have been described and disclosed herein. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A printer for three dimensional printing comprising one or more extrusion cores; wherein each such extrusion core comprises structures surrounding a filament-pathway; wherein the filament-pathway removably receives a filament; wherein the filament enters one-end of the filament-pathway as a solid and leaves a distal-end of the filament-pathway as a liquid; wherein said structures comprise:
 a hot-end that begins at the distal-end; wherein the hot-end comprises a first-temperature-controlled-block surrounding a portion of the filament-pathway; wherein this portion of the filament-pathway comprises a melt-chamber;

a transition-section that begins where the hot-end ends; wherein the transition-section is disposed between the one-end and the distal-end; wherein the transition-section comprises a first-insulator and a second-temperature-controlled-block for heating the filament; wherein the transition-section surrounds a different portion of the filament-pathway, wherein the different portion of the filament-pathway located within the transition-section comprises a diverging-converging-chamber; wherein with respect to a direction of flow of the filament through the filament-pathway from the one-end to the distal-end, the diverging-converging-chamber begins within the second-temperature-controlled-block and ends within the first-insulator; wherein the diverging-converging-chamber minimizes interruptions in the direction of flow of the filament along the filament-pathway;

a cool-end that begins where the transition-section ends and wherein the cool-end ends at the start of the filament-pathway at the one-end; wherein the cool-end comprises a second-insulator surrounding yet another different portion of the filament-pathway;

wherein the first-temperature-controlled-block liquefies portions of the filament passing through the hot-end such that the distal-end discharges liquefied filament.

2. The printer for three dimensional printing according to claim 1, wherein the hot-end comprises a nozzle located at the distal-end.

3. The printer for three dimensional printing according to claim 2, wherein the nozzle is integral with the first-temperature-controlled-block.

4. The printer for three dimensional printing according to claim 2, wherein the nozzle comprises an orifice-opening at the distal-end; wherein this orifice-opening is of a predetermined size.

5. The printer for three dimensional printing according to claim 1, wherein the melt-chamber is an elongated-melt-chamber with a longitudinal length of at least one inch.

6. The printer for three-dimensional printing according to claim 1, wherein the melt-chamber is an elongated-melt-chamber that is longer in length compared to a length of the transition-section.

7. The printer for three dimensional printing according to claim 1, wherein the first-insulator is in communication with the first-temperature-controlled-block and wherein the first-insulator is also in communication with the second-temperature-controlled-block.

8. The printer for three dimensional printing according to claim 1, wherein a cross-section of the diverging-converging-chamber begins with a first-cross-section-size; wherein the cross-section then progresses by increasing in size until a maximum-cross-section is reached; wherein the cross-section then decreases in size until terminating at a second-cross-section-size; wherein the cross-section is substantially perpendicular to a longitude of the filament-pathway.

9. The printer for three dimensional printing according to claim 8, wherein the first-cross-section-size and the second-cross-section-size are substantially a same size.

10. The printer for three dimensional printing according to claim 8, wherein the maximum-cross-section of the diverging-converging-chamber is located at an interface between the second-temperature-controlled-block and the first-insulator.

11. The printer for three dimensional printing according to claim 1, wherein interior surfaces of the filament-pathway are substantially smooth substantially free from burs and hard angles.

12. The printer for three dimensional printing according to claim 1, wherein the first-temperature-controlled-block and the second-temperature-controlled-block are each substantially constructed of aluminum.

13. The printer for three dimensional printing according to claim 1, wherein a portion of the diverging-converging-chamber is located closer to the distal-end is formed within the first-insulator.

14. The printer for three dimensional printing according to claim 13, wherein the portion of the diverging-converging-chamber that is within the first-insulator is in a portion of the first-insulator that is closest to the one-end.

15. The printer for three dimensional printing according to claim 1, wherein temperature in the filament pathway of the transition-section is controlled by way of the second-temperature-controlled-block such that viscosity of the different portion of the filament within the transition-section is high keeping the different portion of the filament within the transition-section in a semi-liquid to a liquid state such that the different portion of the filament within the transition-section acts as its own seal against new and hardened filament entering the transition-section.

16. The printer for three dimensional printing according to claim 1, wherein the transition-section prevents or minimizes jamming of hardened filament in the filament-pathway by increasing a viscosity of the different portion of the filament within the transition-section to a liquid to a semi-liquid which creates a beneficial seal out of the different portion of the filament material itself.

17. A printer for three dimensional printing comprising one or more extrusion cores; wherein each such extrusion core comprises structures surrounding an elongate-volume; wherein the elongate-volume removably receives a filament; wherein this elongate-volume defines and substantially bounds a filament-pathway, wherein the filament enters one-end of the elongate-volume as a solid and leaves a distal-end of the elongate-volume as a liquid; wherein said structures comprise:

a hot-end that begins at the distal-end; wherein the hot-end comprises a first-temperature-controlled-block surrounding a portion of the elongate-volume; wherein this portion of the elongate-volume is a melt-chamber;

a transition-section that begins where the hot-end ends; wherein the transition-section is disposed between the one-end and the distal-end; wherein the transition-section comprises a first-insulator and a second-temperature-controlled-block for heating the filament; wherein the transition-section surrounds a different portion of the elongate-volume;

wherein the different portion of the elongate-volume comprises a diverging-converging-chamber that first diverges and then converges with respect to a direction from the one-end to the distal-end, wherein a widest portion of the diverging-converging-chamber is located at an interface between the first-insulator and the second-temperature-controlled-block;

a cool-end that begins where the transition-section ends and wherein the cool-end ends at the one-end; wherein the cool-end comprises a second-insulator surrounding yet another different portion of the elongate-volume;

wherein the first-temperature-controlled-block liquefies portions of the filament passing through the hot-end such that the distal-end discharges liquefied filament.

18. A printer for three dimensional printing comprising one or more extrusion cores; wherein each such extrusion core comprises structures surrounding a filament-pathway; wherein the filament-pathway removably receives a filament; wherein the filament enters one-end of the filament-pathway as a solid and leaves a distal-end of the filament-pathway as a liquid; wherein the filament-pathway comprises a diverging-converging-chamber; wherein with respect to a direction of flow of the filament through the filament-pathway from the one-end towards the distal-end, the diverging-converging-chamber begins at a first-cross-section-size of diverging-converging-chamber; wherein a cross-section of diverging-converging-chamber then progresses by increasing in size until a maximum-cross-section is reached; wherein the cross-section then decreases in size until terminating at a second-cross-section-size; wherein these cross-sections are substantially perpendicular to a longitude of the filament-pathway; wherein a portion of the diverging-converging-chamber is heated by a temperature-control-block and another different portion of the diverging-converging-chamber is not heated; wherein the diverging-converging-chamber minimizes interruptions in the direction of flow of the filament along the filament-pathway.

19. The printer for three dimensional printing according to claim 18, wherein the first-cross-section-size and the second-cross-section-size are substantially a same size.

20. The printer for three dimensional printing according to claim 18, wherein the structures comprise one or more of: a first-temperature-controlled-block; a first-insulator; a second-temperature-controlled-block, wherein the temperature-controlled-block is the second-temperature-controlled-block; or a second-insulator.

* * * * *